(12) United States Patent
Harada et al.

(10) Patent No.: US 9,281,549 B2
(45) Date of Patent: Mar. 8, 2016

(54) ELECTRICITY STORAGE MODULE

(75) Inventors: Susumu Harada, Hitachinaka (JP);
Masayuki Nakamura, Ishioka (JP);
Kenji Kubo, Hitachi (JP); Ryuji Kohno, Mito (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 292 days.

(21) Appl. No.: 13/394,865

(22) PCT Filed: Aug. 12, 2010

(86) PCT No.: PCT/JP2010/063700
§ 371 (c)(1),
(2), (4) Date: May 4, 2012

(87) PCT Pub. No.: WO2011/040130
PCT Pub. Date: Apr. 7, 2011

(65) Prior Publication Data
US 2012/0214041 A1    Aug. 23, 2012

(30) Foreign Application Priority Data
Sep. 30, 2009  (JP) .................................. 2009-225949

(51) Int. Cl.
| | |
|---|---|
| *H01M 10/50* | (2006.01) |
| *H01M 10/613* | (2014.01) |
| *H01M 10/6563* | (2014.01) |
| *H01M 10/647* | (2014.01) |
| *H01M 10/6557* | (2014.01) |
| *H01M 10/617* | (2014.01) |

(Continued)

(52) U.S. Cl.
CPC .......... *H01M 10/613* (2015.04); *H01M 10/617* (2015.04); *H01M 10/647* (2015.04); *H01M 10/6557* (2015.04); *H01M 10/6563* (2015.04); *H01M 10/6566* (2015.04); *H01M 2/206* (2013.01); *H01M 10/6553* (2015.04)

(58) Field of Classification Search
CPC ..................... H01M 10/5004; H01M 10/5032; H01M 10/5059; H01M 10/5073; H01M 10/5008; H01M 10/5067; H01M 10/5051; H01M 2/206; Y02E 60/12
USPC ............................ 429/120, 7; 361/274.1, 500
See application file for complete search history.

(56) References Cited

U.S. PATENT DOCUMENTS

| | | |
|---|---|---|
| 2005/0231158 A1 | 10/2005 | Higashino |
| 2007/0046259 A1 | 3/2007 | Shimizu |
| 2008/0248379 A1 | 10/2008 | Takeuchi et al. |

FOREIGN PATENT DOCUMENTS

| | | |
|---|---|---|
| EP | 0 776 057 A1 | 5/1997 |
| EP | 1 143 541 A1 | 10/2001 |

(Continued)

OTHER PUBLICATIONS

EP Search Report for European Application No. 10820250.8. issued on Apr. 4, 2014.

*Primary Examiner* — Gary Harris
(74) *Attorney, Agent, or Firm* — Baker Botts L.L.P.

(57) ABSTRACT

An electricity storage module includes: an electric storage unit block that is constituted by arraying a plurality of prismatic electric storage units through a holding member; and a cooling channel that is formed between the electric storage unit and the holding member, through which a cooling medium for cooling the electric storage unit flows. A part of a cooling medium inlet opening of the cooling channel is covered so that a flow speed of a cooling medium after flowing into the cooling channel is higher than a flow speed of a cooling medium before flowing into the cooling channel.

11 Claims, 22 Drawing Sheets

(51) Int. Cl.
*H01M 10/6566* (2014.01)
*H01M 2/20* (2006.01)
*H01M 10/6553* (2014.01)

(56) References Cited

FOREIGN PATENT DOCUMENTS

| EP | 1 583 170 A2 | 10/2005 |
|---|---|---|
| JP | 2000-228228 | 8/2000 |
| JP | 2005-294023 | 10/2005 |
| JP | 2006-172870 | 6/2006 |
| JP | 2006-310309 | 11/2006 |
| JP | 2007-066771 | 3/2007 |
| JP | 2008-097830 | 4/2008 |
| JP | 2008-159439 | 7/2008 |
| JP | 2008159439 A * | 7/2008 |
| JP | 2008-258027 | 10/2008 |
| JP | 2008-269985 | 11/2008 |
| JP | 2008-282545 | 11/2008 |
| JP | 2008282545 A * | 11/2008 |

* cited by examiner

ELECTRICITY STORAGE MODULE

TECHNICAL FIELD

The present invention relates to an electricity storage module that is capable of storing and releasing electrical energy.

BACKGROUND ART

Performance of a electricity supply unit that includes an electricity storage module that is capable of storing and releasing electrical energy is dependent on how much heat generated by the work of a plurality of electric storage units that constitute the electricity storage module is controlled, in other words, how efficiently a plurality of electric storage units can be cooled. Normally, a plurality of electric storage units are cooled by supplying in a parallel direction or a perpendicular direction a cooling medium to the plurality of electrically connected electric storage units and, in order to efficiently cool the plurality of electric storage units, it is necessary to efficiently distribute a cooling medium to a plurality of electric storage units at a uniform flow rate. In addition, it is necessary to improve cooling performance of the electric storage units that lie downstream of the cooling medium. For this reason, it has conventionally been devised to cause turbulence in a cooling medium that flows on the surface of electric storage units and, using this turbulence effect, to improve heat transfer performance between the cooling medium and the electric storage unit surfaces or to increase a heat transfer area from the electric storage units to the cooling medium. The conventional cooling techniques described above are disclosed in Patent Literatures 1 and 2.

CITATION LIST

Patent Literature

[PATENT LITERATURE 1] Japanese Laid Open Patent Publication No. 2006-310309
[PATENT LITERATURE 2] Japanese Laid Open Patent Publication No. 2000-228228

SUMMARY OF INVENTION

Technical Problem

In order to achieve electric storage units with high performance, temperature reduction in the electric storage units by cooling and uniformization of temperature distribution (removal of temperature gradient) are very important. However, the conventional cooling techniques consider temperature reduction in the electric storage units but do not consider uniformization of temperature distribution of the electric storage units. In addition, the conventional cooling techniques do not consider cooling of an electrode terminal of the electric storage units.

Solution to Problem

An electricity storage module according to a first aspect of the present invention, comprises: an electric storage unit block that is constituted by arraying a plurality of prismatic electric storage units through a holding member; and a cooling channel that is formed between the electric storage unit and the holding member, through which a cooling medium for cooling the electric storage unit flows, wherein: a part of a cooling medium inlet opening of the cooling channel is covered so that a flow speed of a cooling medium after flowing into the cooling channel is higher than a flow speed of a cooling medium before flowing into the cooling channel.

According to a second aspect of the present invention, in the electricity storage module according to the first aspect, a covering member may be provided in the cooling medium inlet opening of the cooling channel so as to cover the part of the cooling medium inlet opening.

According to a third aspect of the present invention, in the electricity storage module according to the first or second aspect, a guiding member that deflects a flow of the cooling medium to a direction to a center of the electric storage unit may be provided on a most upstream side of the cooling channel.

According to a fourth aspect of the present invention, in the electricity storage module according to the third aspect, a guiding member that deflects a flow of the cooling medium to a direction outwards from the center of the electric storage unit may be provided on a most downstream side of the cooling channel.

According to a fifth aspect of the present invention, in the electricity storage module according to the fourth aspect, the cooling channel may be divided by connecting the guiding member that is provided on the most upstream side of the cooling channel with the guiding member that is provided on the most downstream side of the cooling channel.

According to a sixth aspect of the present invention, in the electricity storage module according to the first aspect, a conductive member for electrically connecting the electric storage units may be provided in the cooling medium inlet opening of the cooling channel so as to cover the part of the cooling medium inlet opening.

According to a seventh aspect of the present invention, in the electricity storage module according to the sixth aspect, it is preferable that a baffle plate is provided on a most upstream side or a most downstream side of the cooling channel.

According to an eighth aspect of the present invention, in the electricity storage module according to the sixth aspect, a baffle plate may be provided on a most upstream side and a most downstream side of the cooling channel.

According to a ninth aspect of the present invention, in the electricity storage module according to any of the sixth to eighth aspects, it is preferable that a guiding member that deflects a flow of the cooling fluid to a direction to a center of the electric storage unit is provided on a most upstream side of the cooling channel; and a guiding member that deflects a flow of the cooling fluid to a direction outwards from the center of the electric storage unit is provided on a most downstream side of the cooling channel.

Advantageous Effect of the Invention

According to a representative one of the present invention, since the flow speed of a cooling medium after having flown into a cooling channel formed between prismatic electric storage units becomes higher than the flow speed of a cooling medium before having flown into the cooling channel, the heat transfer performance of the cooling medium and the electric storage units can be improved. Due to this, according to the representative one of the present invention, temperature rise can be effectively reduced in a region with the highest temperature of the electric storage units, in particular, the center of the electric storage units, and uniformization of temperature distribution of the electric storage units can be facilitated. Thus, according to the representative one of the present invention, input/output characteristics of energy in individual electric storage units can be improved and the life of the electric storage units can be extended, variation in input/output characteristics of energy and the life between the plurality of electric storage units can be reduced and furthermore, the electricity storage module can be downsized and its reliability can be improved.

DESCRIPTION OF EMBODIMENTS

The embodiments of the present invention will now be explained.

The embodiments will be explained below with an example in which the present invention is applied to an electrical storage device that constitutes an in-vehicle power supply unit of an electric-powered vehicle, in particular, an electric vehicle.

While as an electric vehicle, a hybrid electric vehicle that includes an engine that is an internal combustion engine and an electric machine as driving sources of the vehicle will be explained as an example, the present invention may be applied to another electric vehicle such as a pure electric vehicle, which has an electric machine as the only driving source of the vehicle and can be charged from mains electricity and at the charging station, and a plug-in hybrid electric vehicle, which has an engine and an electric machine as driving sources of the vehicle and can be charged from mains electricity and at the charging station.

While as an electrical storage device that constitutes an in-vehicle power supply unit, a lithium-ion battery device that includes a prismatic lithium-ion secondary battery cell (hereinafter referred to as a "prismatic battery cell") as an electric storage unit will be explained as an example, the present invention may be applied to a device that includes another prismatic electric storage unit capable of storing and releasing electrical energy that includes, for example, a nickel-metal hydride battery, a lead-acid battery, a condenser, a capacitor, and the like.

The structure of the embodiments explained below can be applied to an electrical storage device that constitutes a vehicle power supply unit for another electric-powered vehicle such as a railway vehicle such as a hybrid train, a share-ride vehicle such as a bus, a freight vehicle such as a truck, and an industrial vehicle such as a battery-powered forklift truck.

In addition, the structure of the embodiments explained below can also be applied to an electrical storage device that constitutes a power supply unit other than an electric-powered vehicle, such as an uninterruptible power supply unit that is used for a computer system, a server system, and the like, a power supply unit that is used for home electricity generation equipment, and a power supply unit that is used for electricity generation equipment using natural energy such as sunlight, wind power, and geothermal heat.

The embodiments of the present invention will now be specifically explained with reference to the drawings.

First Embodiment

The first embodiment of the present invention will be explained based upon FIG. 1 to FIG. 5.

Figure 1:
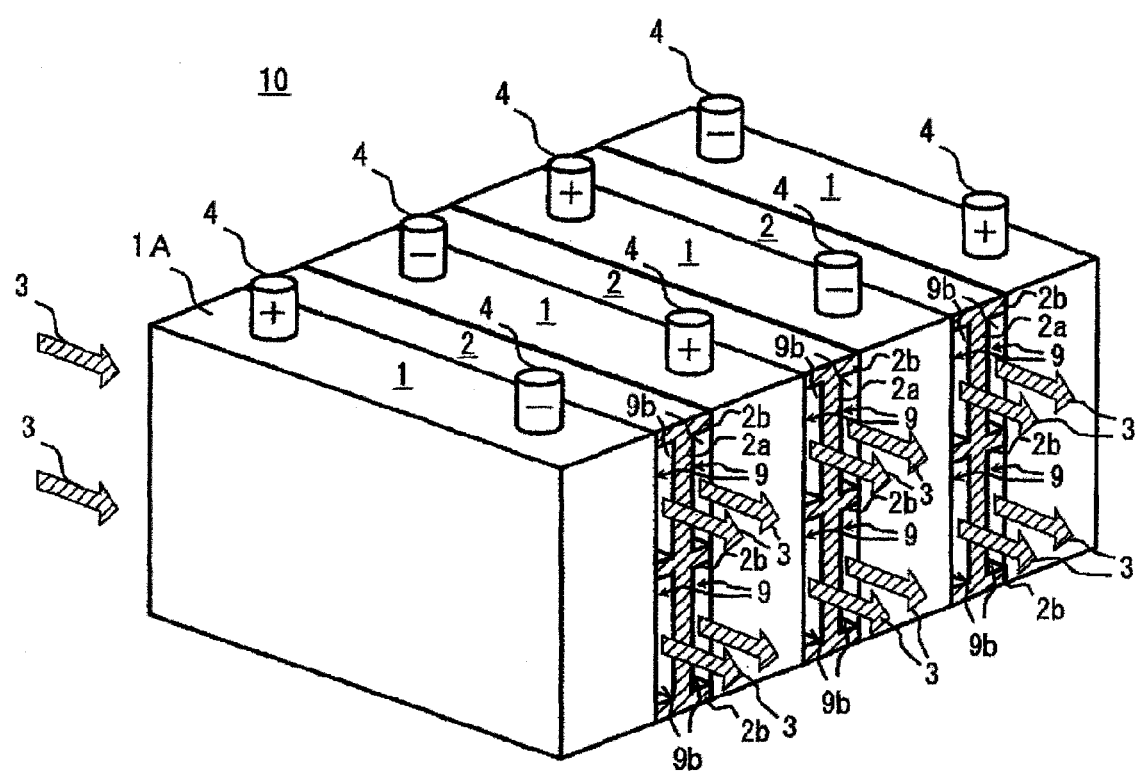
FIG. 1 is a perspective view showing the structure of a prismatic battery assembly according to a first embodiment of the present invention.
Figure 2:
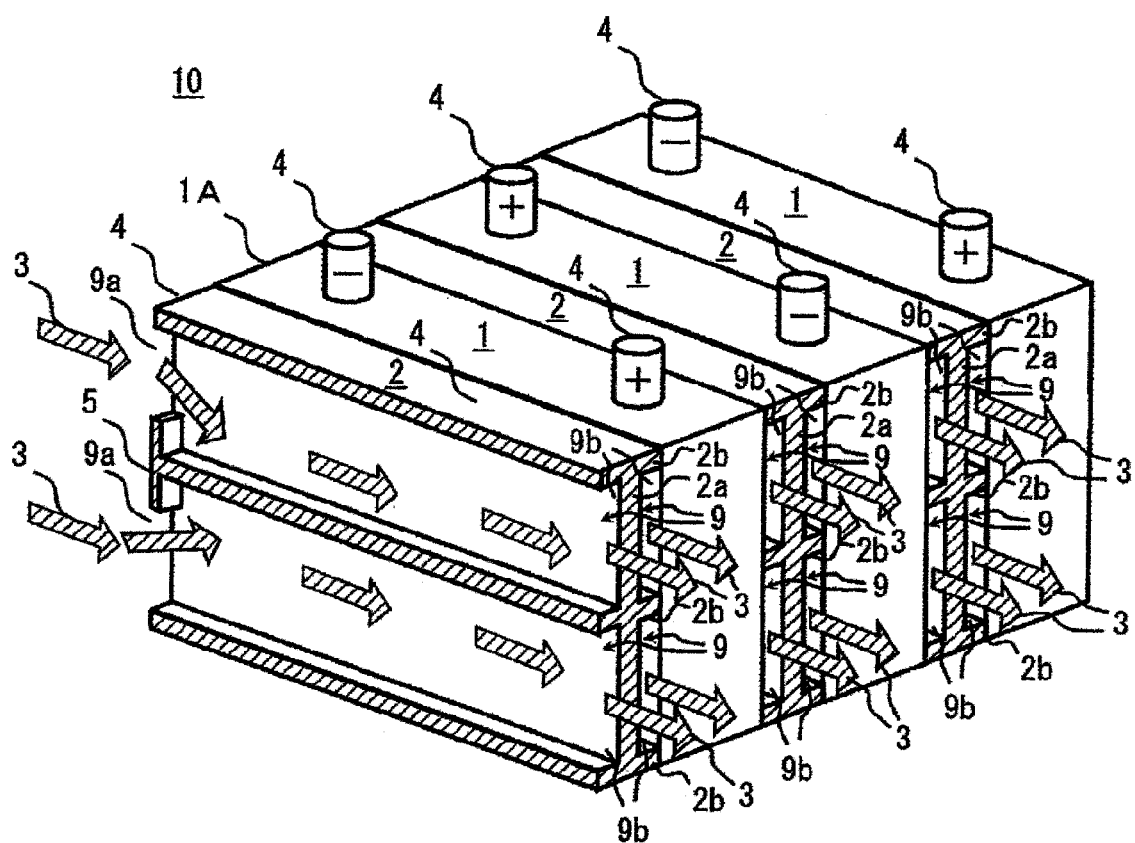
FIG. 2 is a perspective view showing the structure of the prismatic battery assembly according to the first embodiment of the present invention.
Figure 3:
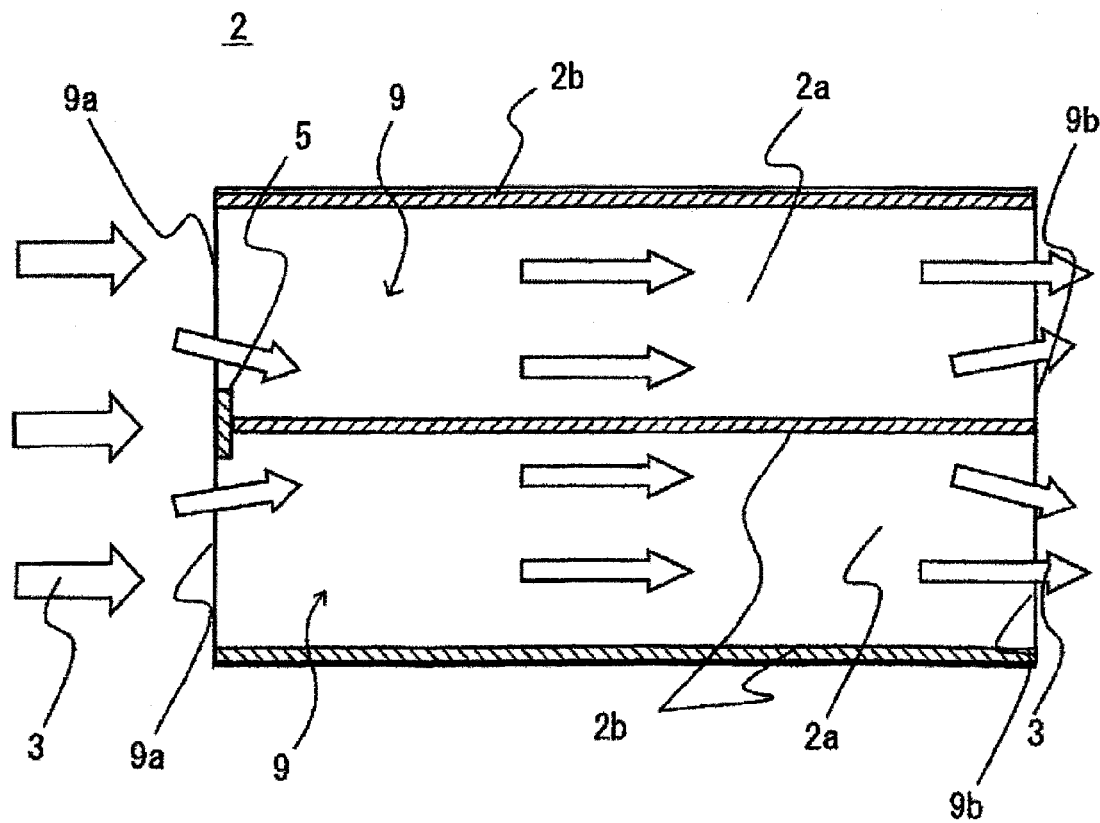
FIG. 3 is a plan view showing the structure of a cell holder of FIG. 1 and FIG. 2.
Figure 4:
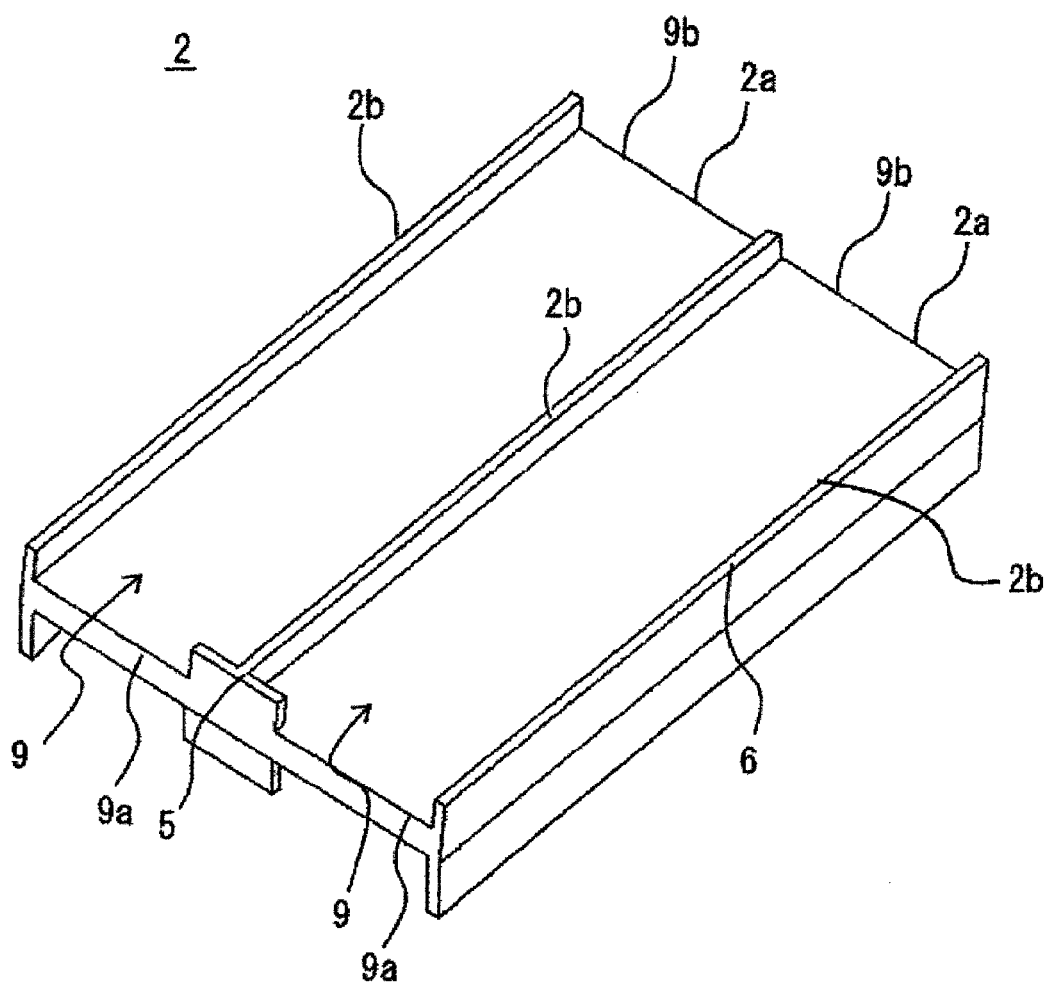
FIG. 4 is a perspective view showing the structure of the cell holder of FIG. 1 and FIG. 2.

A lithium-ion battery device of the present embodiment (hereinafter simply referred to as a "battery device") is constituted by housing in a battery case a prismatic battery module, a control device that manages and controls a state of the prismatic battery module, a cooling fan that circulates a cooling medium that cools the prismatic battery module (for instance, cooling air), and the like. The prismatic battery module includes a prismatic battery assembly (or a prismatic battery block) 10. The prismatic battery assembly 10 is configured by alternately arranging vertically-placed prismatic battery cells 1 and cell holders 2 in a row and electrically connecting the plurality of prismatic battery cells in series. While FIG. 1 and FIG. 2 show four of the prismatic battery cells 1, the prismatic battery assembly 10 is constituted with more prismatic battery cells 1, for example, eight or twelve prismatic battery cells 1 practically.

The prismatic battery cell 1 includes a cell can 1A, an electricity generating component group 1B housed inside the cell can 1A, and a pair of positive and negative electrode terminals 4.

The cell can 1A, which is a flat hexahedron or short prism metal can whose height dimension is less than each of its length and width dimensions, includes a top surface and a bottom surface whose areas are each the largest and four side surfaces whose areas are each less than each of the top surface and the bottom surface. The top surface, the bottom surface, and the side surfaces each have a rectangular (oblong) shape.

It is to be noted that the vertical placement of the prismatic battery cell 1 refers to a placement of the prismatic battery cell 1 so that the top surface and the bottom surface of the cell can 1A are perpendicular to the mounting surface of the prismatic battery cell 1. In addition, a placement of the prismatic battery cell 1 so that the top surface and the bottom surface of the cell can 1A are parallel to the mounting surface of the prismatic battery cell 1 is referred to as a horizontal placement.

Figure 5:
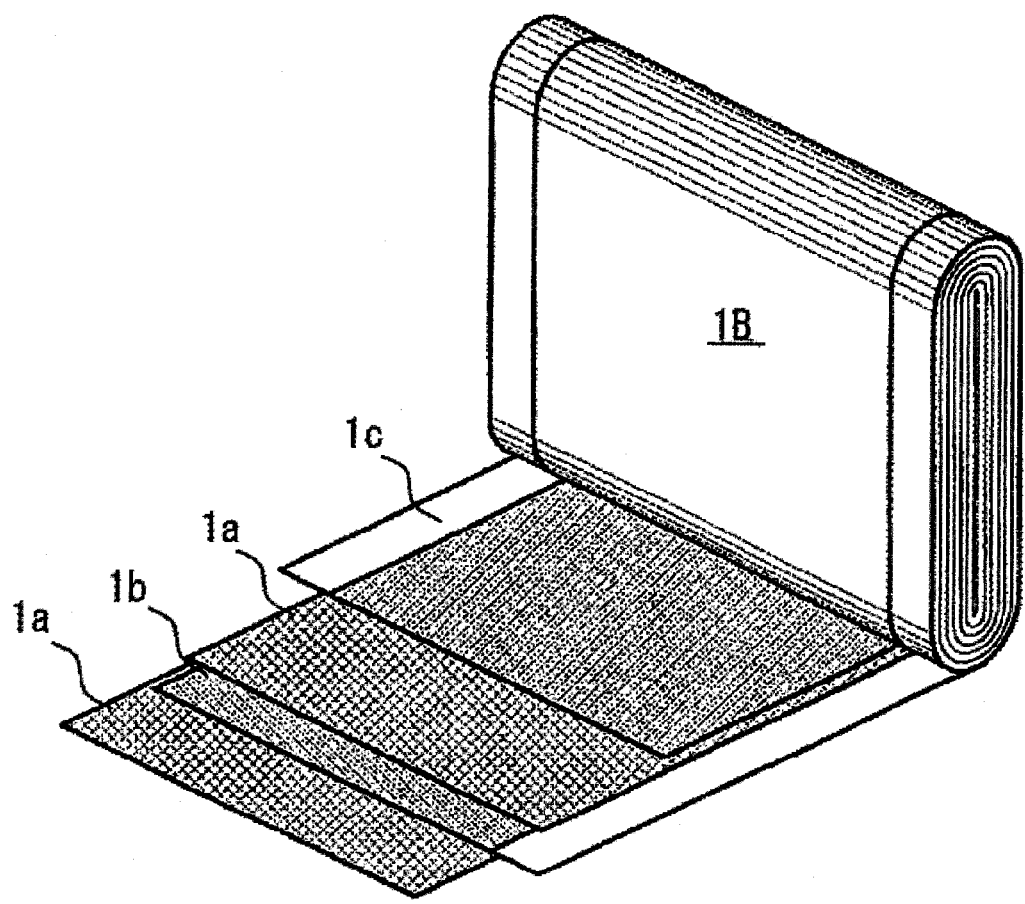
FIG. 5 is a perspective view showing the structure of a winding assembly housed inside a cell can of the prismatic battery cell of FIG. 1 and FIG. 2.

The electricity generating component group 1B housed inside the cell can 1A is a winding body in which a positive plate 1c and a negative plate 1b are wound through a separator 1a and, as shown in FIG. 5, is a winding assembly in which the belt-like laminated body where the separator 1a, the negative plate (negative sheet) 1b, the separator 1a, and the positive plate (positive sheet) 1c are laminated in this order is wound so that a cross section of the winding becomes elliptical or oval. In addition, there is electrolyte solution inside the cell can 1A.

The positive plate 1c is a thin foil current collector of, for example, 20 µm thick, more specifically, an aluminium foil with positive-electrode active material mix such as lithium manganate coated on both sides thereof as a positive-electrode active material. The negative plate 1b is a thin foil current collector of, for instance, 20 µm thick, more specifically, a copper foil with negative-electrode active material mix such as graphite coated on both sides thereof as a negative-electrode active material. The separator 1a is a thin member of, for example, 30 µm thick, more specifically, a resin microporous insulating film such as polyethylene and polypropylene.

The pair of positive and negative electrode terminals 4 are cylindrical or bolt-like conductive members that protrude from both longitudinal end portions of one of the side surfaces of the cell can 1A, i.e., the side surface that is opposite to the side surface that serves as the mounting surface of the prismatic battery cell 1. The positive electrode-side electrode terminal 4 is electrically connected to a positive electrode of the electricity generating component group 1B. The negative electrode-side electrode terminal 4 is electrically connected to a negative electrode of the electricity generating component group 1B.

It is to be noted that the electrode terminal 4 may be a terminal that has a flat, plate-like end portion.

The plurality of prismatic battery cells 1 are electrically connected in series by electrically connecting the positive electrode-side electrode terminal 4 of one of the adjacent prismatic battery cells 1 with the negative electrode-side electrode terminal 4 of the other of the adjacent prismatic battery cells 1. Here, the adjacent prismatic battery cells 1 are arranged in a state where one of the adjacent prismatic battery cells 1 rotates 180 degrees with respect to the other of the adjacent prismatic battery cells 1 about the central axis that extends in the mounting direction of the prismatic battery cells 1 in a direction parallel to the top surface and the bottom surface when the prismatic battery cells 1 are placed vertically) as a rotational axis. By doing this, the positive electrode-side electrode terminal 4 of the one of the adjacent prismatic battery cells 1 and the negative electrode-side electrode terminal 4 of the other of the adjacent prismatic battery cells 1, which is electrically connected thereto, are arrayed in the same position, thereby allowing the both to be connected with ease via a bus bar that is a conductive connection member.

The cell holder 2 is an irregularity member that electrically insulates between the adjacent prismatic battery cells 1 as well as forming a certain interval between the adjacent prismatic battery cells 1 and transferring to the prismatic battery cells 1 pressure (constraint force or holding force) that is applied from an array direction of the prismatic battery cells 1 (from a direction perpendicular to the to surface and the bottom surface when the prismatic battery cells 1 are vertically placed) to the prismatic battery assembly 10 so as to retain the prismatic battery cells 1. The cell holder 2 is a plastic molding that is formed from an electrically insulating member.

The cell holder 2 includes a planar portion 2a and a protrusion (ridge) 2b. The planar portion 2a, which is a plate member that faces opposite to the top surface or the bottom surface of the prismatic battery cell 1, includes a plane that has the same size and the same shape as those of the top surface or the bottom surface of the prismatic battery cell 1. The protrusion 2b is a part that extends in a straight line from one longitudinal end of the planar portion 2a to the other thereof and is formed so as to perpendicularly protrude from three locations on the front and back surfaces of the planar portion 2a, i.e., both transverse end portions (edge portions) and the center portion of the planar portion 2a towards the prismatic battery cell 1. The protrusion heights of the three protrusions 2b are the same. The protrusion 2b of the center portion also serves as a restraint section that presses the center portion of the prismatic battery cell 1 from the opposite direction and restrains bulge that occurs at the center portion of the prismatic battery cell 1.

It is to be noted that the cell holder 2 may have a structure in which the prismatic battery cell 1 is surrounded and held. In this case, a protrusion that protrudes toward the prismatic battery cell 1 more than the protrusion 2b does may be provided outside the protrusion 2b provided at the both transverse end portions of the planar portion 2a of the cell holder 2.

Between the cell holder 2 and the prismatic battery cell 1, a cooling channel 9 through which a cooling medium 3 that cools the prismatic battery cell 1, e.g., cooling air, flows is formed. In the prismatic battery cell 1, the top and bottom surfaces of the cell can 1A are cooled by the cooling medium 3 that flows through the cooling channel 9 formed on the both sides of the array direction of the prismatic battery cells 1. The cooling channel 9 is formed with the planar portion 2a and the protrusions 2b of the cell holder 2 and the top surface or the bottom surface of the prismatic battery cell 1 so that the cooling channel 9 extends from one end portion side of the prismatic battery cell 1 in the longitudinal direction to the other end portion side in a straight line in order to cause the cooling medium 3 to flow from the one end portion side of the prismatic battery cell 1 towards the other end portion side in the longitudinal direction while cooling a surface of the cell can 1A and to be divided into two in the transverse direction of the prismatic battery cell 1. The divided two cooling channels 9 have the same width in the transverse direction.

A cooling medium inlet opening 9a (the most upstream of the cooling channel 9) formed at the one end portion in the longitudinal direction of the prismatic battery cell 1 is provided with a baffle plate 5. The baffle plate 5 is a rectangular (oblong) flat plate member that is integrally formed on the cell holder 2 so as to be perpendicular to the protrusion 2b at the front end of the one longitudinal side (the one end portion side in the longitudinal direction of the prismatic battery cell 1) of the protrusion 2b provided at the transverse center portion of the cell holder 2. The baffle plate 5 covers a part of the cooling medium inlet opening 9a at the transverse center portion of the cell holder 2 (the boundary portion of the two cooling channels 9 formed by being divided in the transverse direction of the prismatic battery cell 1). In addition, the baffle plate 5 is provided to protrude perpendicularly from the front and back surfaces of the planar portion 2a of the cell holder 2 towards the prismatic battery cell 1. The protrusion height of the baffle plate 5 is the same as the protrusion height of the protrusion 2b. 9b represents a cooling medium outlet opening It is to be noted that the baffle plate 5 may be integrated with or separated from the protrusion 2b.

In this manner, a member that covers a part of the cooling channel 9, for example, the baffle plate 5 is provided on an upstream side of the cooling channel 9, preferably the most upstream thereof. The baffle plate 5 can be provided with ease by being formed integrally with the cell holder 2 provided between the prismatic battery cells 1. When the baffle plate 5 covers a part of the cooling medium inlet opening 9a, an inflow area of the cooling medium 3 at the cooling medium inlet opening 9a becomes less than an outflow area of the cooling medium outlet opening 9b (the most downstream of the cooling channel 9) formed at the other end portion in the longitudinal direction of the prismatic battery cell 1 or a flow area inside the cooling channel 9. Accordingly, if the cooling medium 3 is caused to flow in at the same flow rate as that without the baffle plate 5, the flow speed of the cooling medium 3 inside the cooling channel 9 becomes higher than the flow speed of the cooling medium 3 before flowing into the cooling channel 9 through the cooling medium inlet opening 9a.

As the flow speed of the cooling medium 3 becomes higher, the heat transfer rate between the top surface or the bottom surface of the prismatic battery cell 1 and the cooling medium 3 becomes greater in a region more downstream than the cooling medium inlet opening 9a, so that temperature rise due to charge/discharge of the prismatic battery cell 1 can be reduced in a region more downstream than the cooling medium inlet opening 9a, the region where temperature becomes high, in particular, the center portion of the prismatic battery cell 1. This allows temperature in the center portion of the prismatic battery cell 1, i.e., the region where temperature becomes highest to be brought close to temperature in another region, and hence temperature distribution at the prismatic battery cell 1 can be brought close to uniformity.

Hence, according to the cooling structure of the battery module of the present embodiment, cooling performance of the prismatic battery cell 1 can be improved more than ever. Due to this, according to the prismatic battery cell 1 of the present embodiment, high performance, improvement in charge/discharge characteristics (or input/output characteristics), extension of the life, and the like can be achieved. In addition, according to the battery module of the present embodiment, improved cooling performance reduces variation in charge/discharge characteristics between the plurality of prismatic battery cells 1 and variation in their lives. In addition, according to the battery module of the present embodiment, improved cooling performance allows improvement in downsizing and reliability to be achieved.

It is to be noted that although in a region immediately after the baffle plate 5, there is a part in which the flow speed of the cooling medium 3 becomes low and cooling efficiency is slightly reduced, an appropriate selection of the size of the baffle plate 5 can limit reduction in cooling efficiency due to reduction in the flow speed of the cooling medium 3.

In addition, another shape, for example, a half circle shape may be adopted in the baffle plate 5 as long as the operations and advantageous effects mentioned above can be achieved.

In addition, the cooling medium 3 is guided to the cooling medium inlet opening 9a by a blower (cooling fan) and a ventilation duct not shown in the figures and is released from the cooling medium outlet opening 9b.

Second Embodiment

Figure 6:
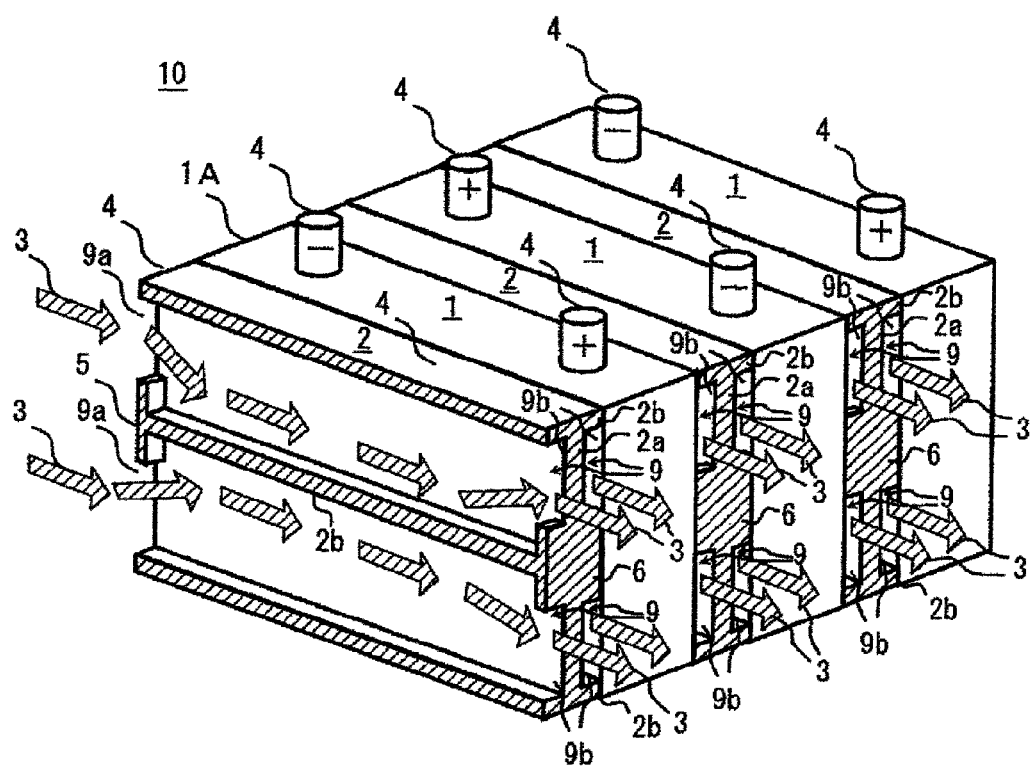
FIG. 6 is a perspective view showing the structure of a prismatic battery assembly according to a second embodiment of the present invention, viewed from the outflow side of the cooling medium.
Figure 7:
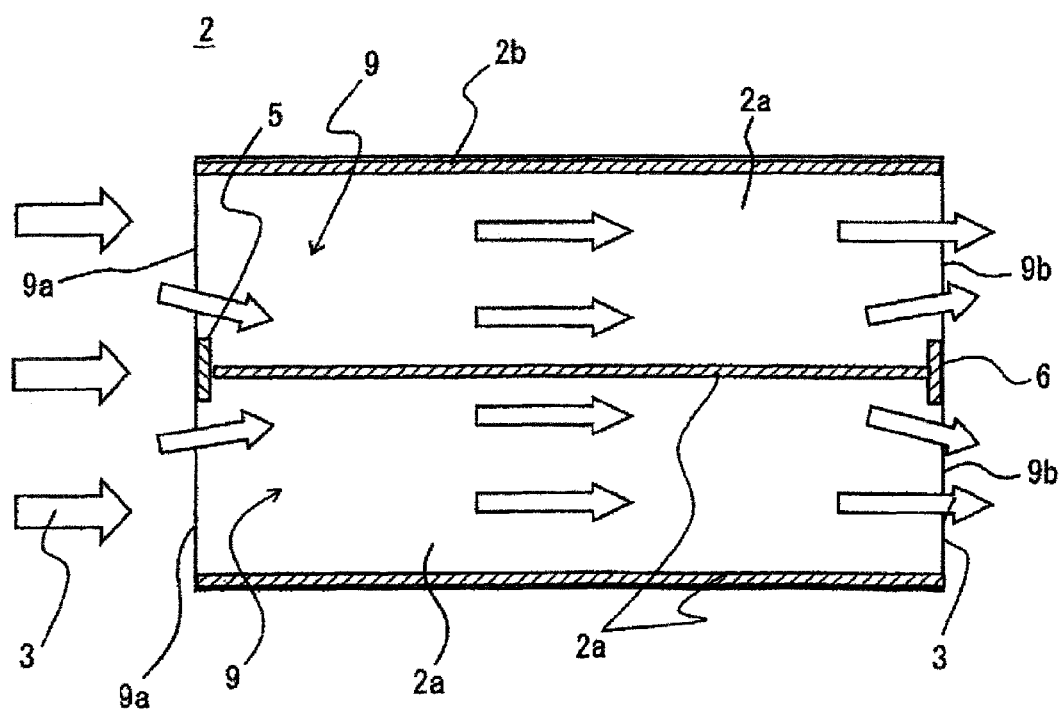
FIG. 7 is a plan view showing the structure of the cell holder of FIG. 6.
Figure 8:
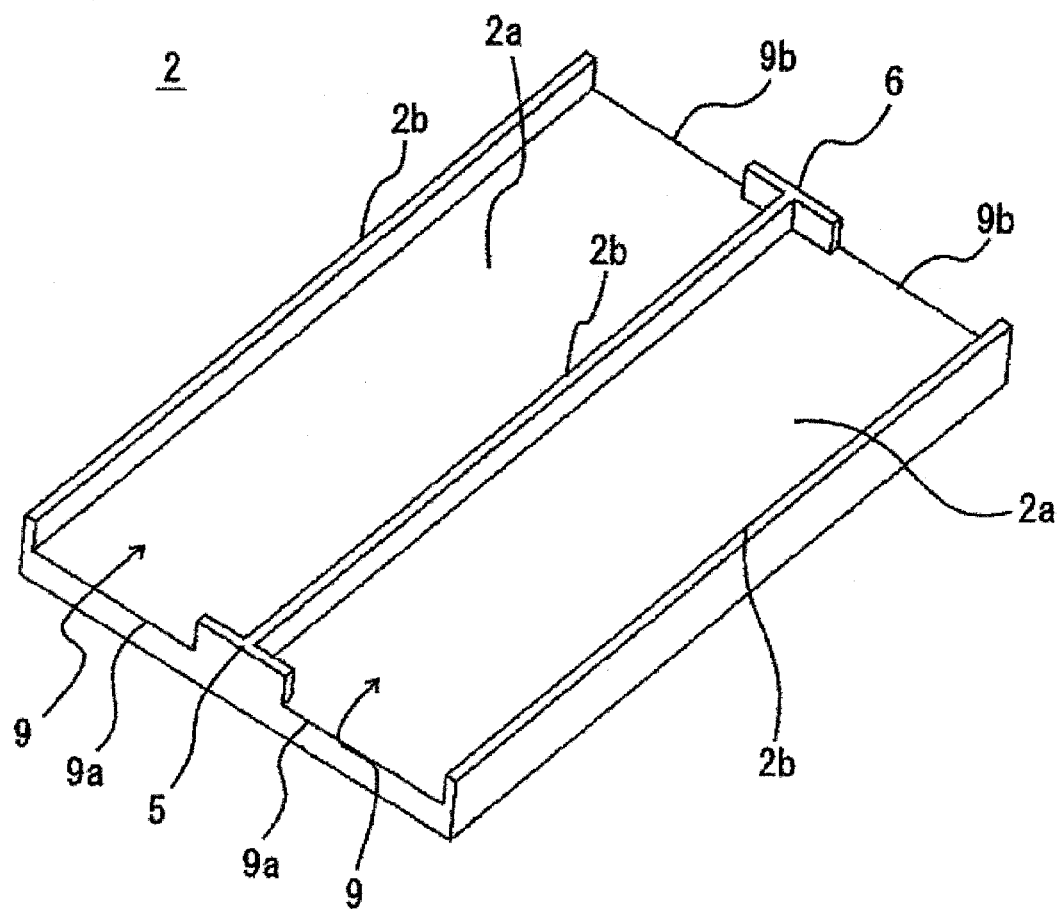
FIG. 8 is a perspective view showing the structure of the cell holder of FIG. 6.

The second embodiment of the present invention will be explained based upon FIG. 6 to FIG. 8.

The present embodiment, which is an improvement example of the first embodiment, has a part of the structure of the cell holder 2 that is different from that of the first embodiment. The other parts of the structure are the same as those of the first embodiment. For this reason, parts that are the same as those of the first embodiment are designated by the same reference numerals of the first embodiment, and their description will be curtailed.

In the present embodiment, a baffle plate 6 with the same shape and the same size as the baffle plate 5 provided in the cooling medium inlet opening 9a is provided, symmetrically to the baffle plate 5, in the cooling medium outlet opening 9b, which is the most downstream of the cooling channel 9. This causes the cooling medium outlet opening 9b to be partially covered in the transverse center portion of the cell holder 2 (the boundary portion of the two cooling channels 9 formed by being divided in the transverse direction of the prismatic battery cell 1).

The baffle plate 6 is a flat plate member in a rectangular (oblong) shape integrally formed with the cell holder 2 so as to be perpendicular to the protrusion 2b at the front end of the other longitudinal side (the other end portion side in the longitudinal direction of the prismatic battery cell 1) of the protrusion 2b provided in the transverse center portion of the cell holder 2. In addition, the baffle plate 6 is in a position relationship symmetrical to the baffle plate 5. In addition, the baffle plate 6 is provided so as to perpendicularly protrude from the front and back surfaces of the planar portion 2a of the cell holder 2 towards the prismatic battery cell 1 (it is to be noted that while FIG. 8 illustrates a case in which the protrusion 2b is provided only on one surface, it is provided on the both surfaces in practice as explained.). The protrusion height of the baffle plate 6 is the same as the protrusion height of the protrusion 2b.

It is to be noted that the baffle plate 6 may be integrated with or separated from the protrusion 2b.

In the present embodiment, since the same operations and advantageous effects as those in the first embodiment can be achieved and the baffle plate 6 is provided symmetrically to the baffle plate 5, holding force applied from the cell holder 2 to the prismatic battery cell 1 can act uniformly.

Third Embodiment

Figure 9:
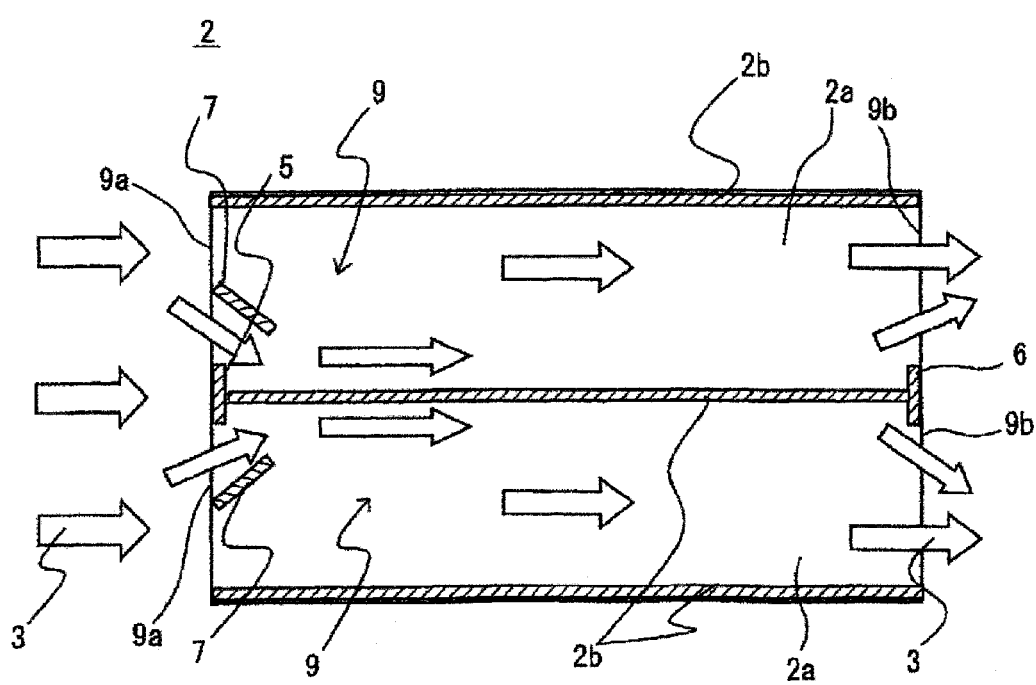
FIG. 9 is a plan view showing the structure of the cell holder used in the prismatic battery assembly according to a third embodiment of the present invention.

The third embodiment of the present invention will be explained based upon FIG. 9.

The present embodiment, which is an improvement example of the second embodiment, has a part of the structure of the cell holder 2 that is different from that of the second embodiment. The other parts of the structure are the same as those of the second embodiment. For this reason, parts that are the same as those of the second embodiment are designated by the same reference numerals of the second embodiment, and their description will be curtailed.

In the present embodiment, a pair of guide plates 7 are provided in the vicinity of the baffle plate 5 provided in the cooling medium inlet opening 9a. The pair of guide plates 7, which are each a flat plate member in a rectangular (oblong) shape that deflects a part of the flow of the cooling medium 3 to the center portion (the center portion of the prismatic battery cell 1) of the cell holder 2, are integrally formed with the cell holder 2. In addition, the pair of guide plates 7 are arranged axisymmetrically about the protrusion 2b provided in the transverse center portion of the cell holder 2 as a central line. More specifically, the pair of guide plates 7 are members arranged in an A shape that slope inward from the transverse end portion sides of the cell holder 2 in a direction from the one side of the cell holder 2 in the longitudinal direction towards the other side thereof. In other words, the pair of guide plates 7 are members that are arranged so as to spread out in a direction from the other longitudinal side of the cell holder 2 to the one side thereof. In addition, the pair of guide plates 7 are provided so as to perpendicularly protrude from the front and back surfaces of the planar portion 2a of the cell holder 2 towards the prismatic battery cell 1. The protrusion heights of the pair of guide plates 7 are each the same as the protrusion height of the protrusion 2b.

It is to be noted that another shape, for example, a circular arc shape in a quarter circle shape may be adopted in the guide plate 7 as long as the operations and advantageous effects mentioned above can be achieved.

In the present embodiment, the same operations and advantageous effects as those in the second embodiment can be achieved, and since the pair of guide plates 7 are provided, the flow of the cooling medium 3 can be deflected to the center portion of the prismatic battery cell 1. Due to this, in the present embodiment, the center portion of the prismatic battery cell 1 where heat relatively remains can be effectively cooled, and cooling performance of the prismatic battery cell 1 can be further improved.

Fourth Embodiment

Figure 10:
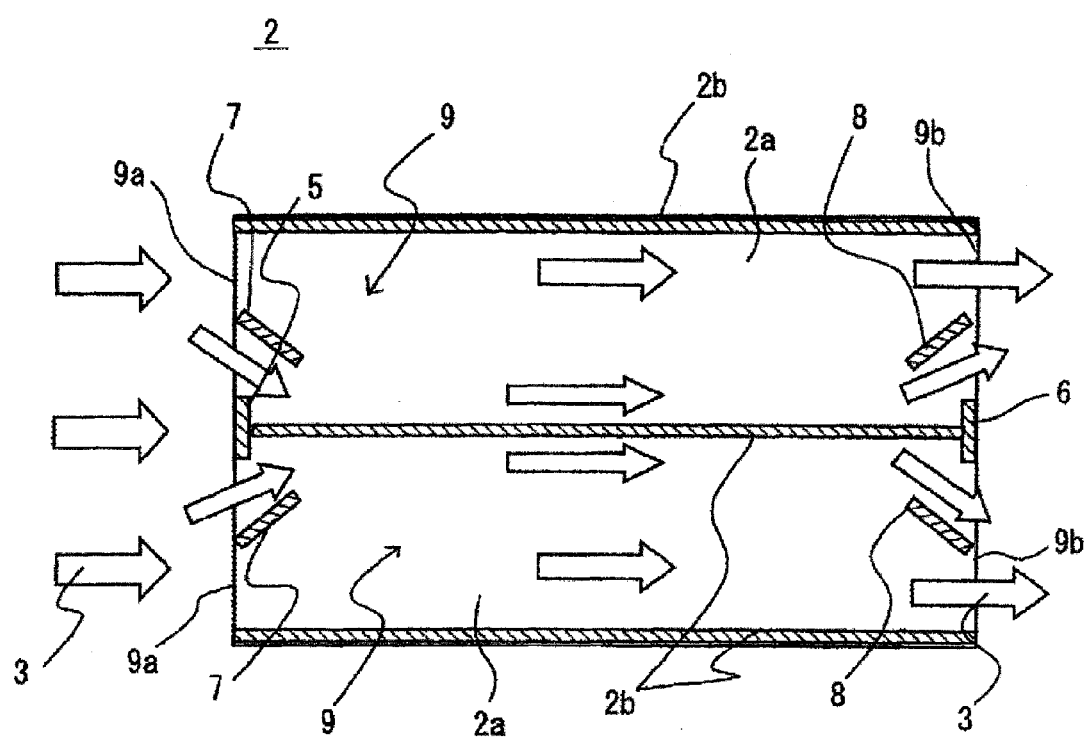
FIG. 10 is a plan view showing the structure of the cell holder used in the prismatic battery assembly according to a fourth embodiment of the present invention.

The fourth embodiment of the present invention will be explained based upon FIG. 10.

The present embodiment, which is an improvement example of the third embodiment, has a part of the structure of the cell holder 2 that is different from that of the third embodiment. The other parts of the structure are the same as those of the third embodiment. For this reason, parts that are the same as those of the third embodiment are designated by the same reference numerals of the third embodiment, and their description will be curtailed.

In the present embodiment, a pair of guide plates 8 that are arranged differently from the pair of guide plates 7 provided in the cooling medium inlet opening 9a are provided, symmetrically to the pair of guide plates 7, in the cooling medium outlet opening 9b, which is the most downstream of the cooling channel 9.

The pair of guide plates 8 are provided in the vicinity of the baffle plate 6 provided in the cooling medium outlet opening 9b. The pair of guide plates 8, which are each a flat plate member in a rectangular (oblong) shape that deflects a part of the flow of the cooling medium 3 in the center portion of the cell holder 2 (the center portion of the prismatic battery cell 1) to the transverse end portion sides of the cell holder 2, are integrally formed with the cell holder 2. In addition, the pair of guide plates 8 are arranged axisymmetrically about the protrusion 2b provided in the transverse center portion of the cell holder 2 as a central line. More specifically, the pair of guide plates 8 are members arranged in an A shape that slope from inside the cell holder 2 towards the transverse end portion sides thereof in a direction from the one side of the cell holder 2 in the longitudinal direction towards the other side thereof. In other words, the pair of guide plates 8 are members that are arranged so as to spread out in a direction from the one longitudinal side of the cell holder 2 to the other side thereof. In addition, the pair of guide plates 8 are provided so as to perpendicularly protrude from the front and back surfaces of the planar portion 2a of the cell holder 2 towards the prismatic battery cell 1. The protrusion heights of the pair of guide plates 8 are each the same as the protrusion height of the protrusion 2b.

It is to be noted that another shape, for example, a circular arc shape in a quarter circle shape may be adopted in the guide plate 8 of downstream as long as the operations and advantageous effects mentioned above can be achieved.

In the present embodiment, the same operations and advantageous effects as those in the third embodiment can be achieved, and since the pair of guide plates 8 are provided, the flow of the cooling medium 3 can be deflected outward from the center portion of the prismatic battery cell 1. Thus, the flow of the cooling medium 3 can be regulated and the flow rate of the cooling medium 3 can be further increased. Due to this, in the present embodiment, the center portion of the prismatic battery cell 1 where heat relatively remains can be effectively cooled, and cooling performance of the prismatic battery cell 1 can be further improved.

Fifth Embodiment

Figure 11:
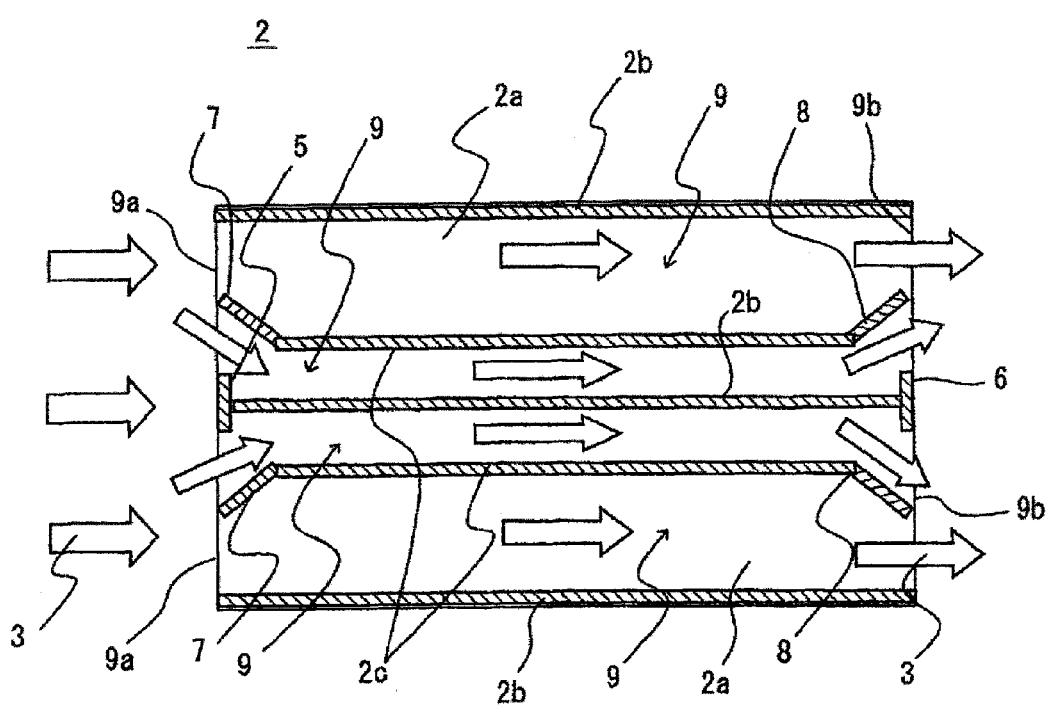
FIG. 11 is a plan view showing the structure of the cell holder used in the prismatic battery assembly according to a fifth embodiment of the present invention.

The fifth embodiment of the present invention will be explained based upon FIG. 11.

The present embodiment, which is an improvement example of the fourth embodiment, has a part of the structure of the cell holder 2 that is different from that of the fourth embodiment. The other parts of the structure are the same as those of the fourth embodiment. For this reason, parts that are the same as those of the fourth embodiment are designated by the same reference numerals of the fourth embodiment, and their description will be curtailed.

In the present embodiment, the end portion, toward the guide plate 8, of one (one transverse side of the cell holder 2) of the pair of guide plates 7 and the end portion, toward the guide plate 7, of one (one transverse side of the cell holder 2) of the pair of guide plates 8 are connected through a protrusion (ridge) 2c that extends in the longitudinal direction of the cell holder 2. In addition, the end portion, toward the guide plate 8, of the other (the other transverse side of the cell holder 2) of the pair of guide plates 7 and the end portion, toward the guide plate 7, of the other (the other transverse side of the cell holder 2) of the pair of guide plates 8 are connected through a protrusion (ridge) 2c that extends in the longitudinal direction of the cell holder 2. Due to this, each of the cooling channels 9 that has been divided into two in the transverse direction of the cell holder 2 by the protrusion 2b of the center portion in the transverse direction of the cell holder 2 is further divided into two in the transverse direction of the cell holder 2. That is, in the present embodiment, the cooling channels 9 divided into four in the transverse direction of the cell holder 2 are formed. Each of the two cooling channels 9 (the cooling channels 9 formed between the protrusion 2b of the center portion in the transverse direction of the cell holder 2 and the protrusions 2c) arranged at the transverse center portion of the cell holder 2 has the same transverse width that is less than the transverse width of each of the two cooling channels 9 (the cooling channels 9 formed between the protrusions 2b in the transverse end portions of the cell holder 2 and the protrusions 2c) arranged at the both transverse end portions of the cell holder 2. Each of the two cooling channels 9 arranged at the both transverse end portions of the cell holder 2 has the same transverse width. The protrusions 2c are integrally formed with the cell holder 2 so as to protrude from the planar portion 2a of the cell holder 2 towards the top surface or the bottom surface of the prismatic battery cell 1. The protrusion height of the protrusions 2c is the same as the protrusion height of the protrusion 2b. In addition, the protrusions 2c are integrally formed with the guide plate 7 and the guide plate 8.

It is to be noted that the protrusions 2c may be formed in close proximity to the end portion of each of the guide plate 7 and the guide plate 8 separately from the guide plate 7 and the guide plate 8 or in contact with them.

In the present embodiment, the same operations and advantageous effects as those in the fourth embodiment can be achieved, and since the cooling channel 9 is divided by the protrusions 2c into the transverse end portion side and the center side of the cell holder 2, the flow of the cooling air 3 that has been deflected by the guide plate 7 to the center portion of the cell holder 2 (the center portion of the prismatic battery cell 1) can be assured to flow in the center portion of the cell holder 2 (the center portion of the prismatic battery cell 1). Due to this, in the present embodiment, the center portion of the prismatic battery cell 1 where heat relatively remains can be cooled more effectively, and cooling performance of the prismatic battery cell 1 can be further improved.

In addition, in the present embodiment, since the two protrusions 2c are formed in addition to the three protrusions 2b, pressure (constraint force or holding force) applied from the array direction of the prismatic battery cells 1 to the prismatic battery assembly 10 can be transmitted in a more dispersed manner from the cell holder 2 to each of the prismatic battery cells 1, so that a holding strength of the prismatic battery cell 1 can be further improved. Due to this, in the present embodiment, vibration resistance and strength of the prismatic battery module can be improved. In addition, in the present embodiment, the center portion of the prismatic battery cell 1 is pressed from the opposite direction by the three protrusions, i.e., the protrusion 2b of the center portion in the transverse direction of the cell holder 2 and the two protrusions 2c, thereby further increasing force to restrain bulge that occurs in the center portion of the prismatic battery cell 1. Due to this, in the present embodiment, bulge of the prismatic battery cell 1 can be further reduced and the performance of the prismatic battery cell 1 can be further improved.

Sixth Embodiment

Figure 12:
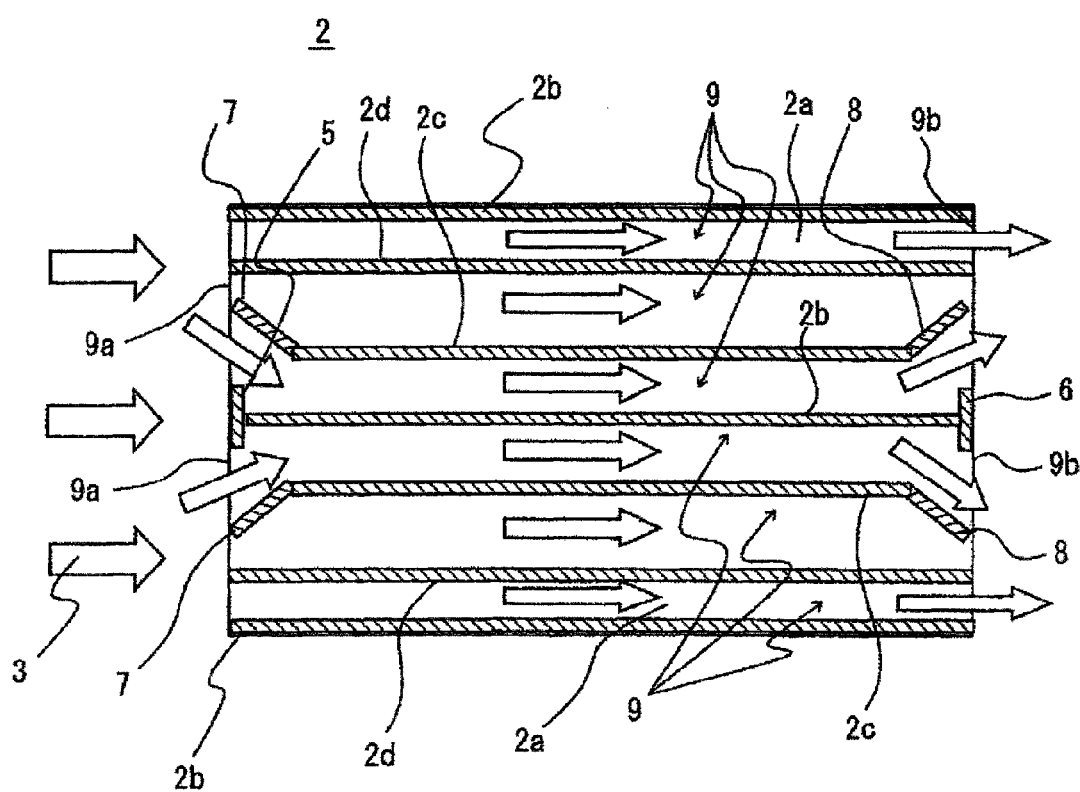
FIG. 12 is a plan view showing the structure of the cell holder used in the prismatic battery assembly according to a sixth embodiment of the present invention.
Figure 13:
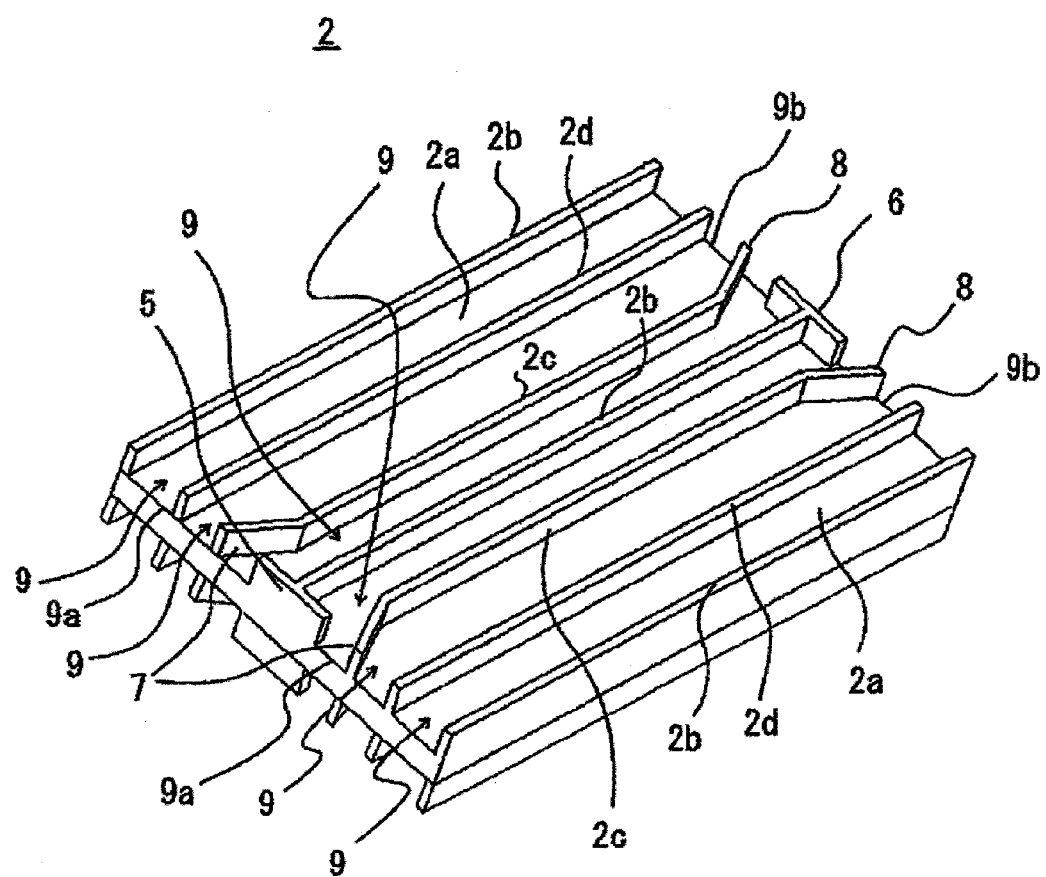
FIG. 13 is a perspective view showing the structure of the cell holder of FIG. 12.

The sixth embodiment of the present invention will be explained based upon FIG. 12 and FIG. 13.

The present embodiment, which is an improvement example of the fifth embodiment, has a part of the structure of the cell holder 2 that is different from that of the fifth embodiment. The other parts of the structure are the same as those of the fifth embodiment. For this reason, parts that are the same as those of the fifth embodiment are designated by the same reference numerals of the fifth embodiment, and their description will be curtailed.

In the present embodiment, the cooling channel 9 formed between the protrusion 2b provided in the transverse end portion of the cell holder 2 and the protrusion 2c is further divided into two in the transverse direction of the cell holder 2. Due to this, in the present embodiment, a protrusion (ridge) 2d, which has the same length, height, and shape as those of the protrusion 2b, is provided between the protrusion 2b provided in the transverse end portion of the cell holder 2 and the protrusion 2c. Due to this, in the present embodiment, the cooling channel 9 that is divided into six in the transverse direction of the cell holder 2 is formed. Each of the two cooling channels 9 that are formed between the protrusions 2b in the both transverse end portions of the cell holder 2 and the protrusions 2d has the same transverse width that is less than the transverse width of the cooling channel 9 formed between the protrusion 2d and the protrusion 2c and is less than the transverse width of the cooling channel 9 formed between the protrusion 2b of the center portion in the transverse direction of the cell holder 2 and the protrusion 2c. Each of the two cooling channels 9 formed between the protrusion 2d and the protrusion 2c has the same transverse width that is greater than the transverse width of the cooling channel 9 formed between the protrusion 2b of the center portion in the transverse direction of the cell holder 2 and the protrusion 2c. The protrusions 2d are integrally formed with the cell holder 2 so as to protrude from the planar portion 2a of the cell holder 2 towards the top surface or the bottom surface of the prismatic battery cell 1. The protrusion height of the protrusions 2d is the same as the protrusion height of each of the protrusions 2b and 2c.

In the present embodiment, since the two protrusions 2d are formed in addition to the five protrusions 2b and 2c, pressure (constraint force or holding force) applied from the array direction of the prismatic battery cells 1 to the prismatic battery assembly 10 can be transmitted in a further dispersed manner from the cell holder 2 to each of the prismatic battery cells 1, so that a holding strength of the prismatic battery cell 1 can be further improved. Due to this, in the present embodiment, vibration resistance and strength of the prismatic battery module can be improved.

In addition, in the present embodiment, since the channel distribution and the flow speed of the cooling medium 3 can be appropriately set in accordance with the temperature distribution of the prismatic battery cell 1 by using the cooling channel 9 formed by the seven protrusions 2b, 2c, and 2d, the baffle plates 5 and 6, and the guide plates 7 and 8, the temperature distribution of the prismatic battery cell 1 can be further uniformed. More specifically, cooling performance by the cooling medium 3 is controlled in accordance with the temperature distribution of the prismatic battery cell 1 as cooling performance of the cooling medium 3 flowing in the transverse center portion of the prismatic battery cell 1 is set to the maximum, cooling performance of the cooling medium 3 flowing in the both transverse end portions of the prismatic battery cell 1 is set to the minimum, and cooling performance of the cooling medium 3 in the intermediate portion between the transverse center portion of the prismatic battery cell 1 and the both transverse end portions of the prismatic battery cell 1 is set to the midway between the maximum and the minimum. This allows the temperature distribution of the prismatic battery cell 1 to be more uniformed than that of the first to the fifth embodiments. Hence, in the present embodiment, cooling performance of the prismatic battery cell 1 can be improved more than that of the first to the fifth embodiments.

Analysis Example

Figure 14:
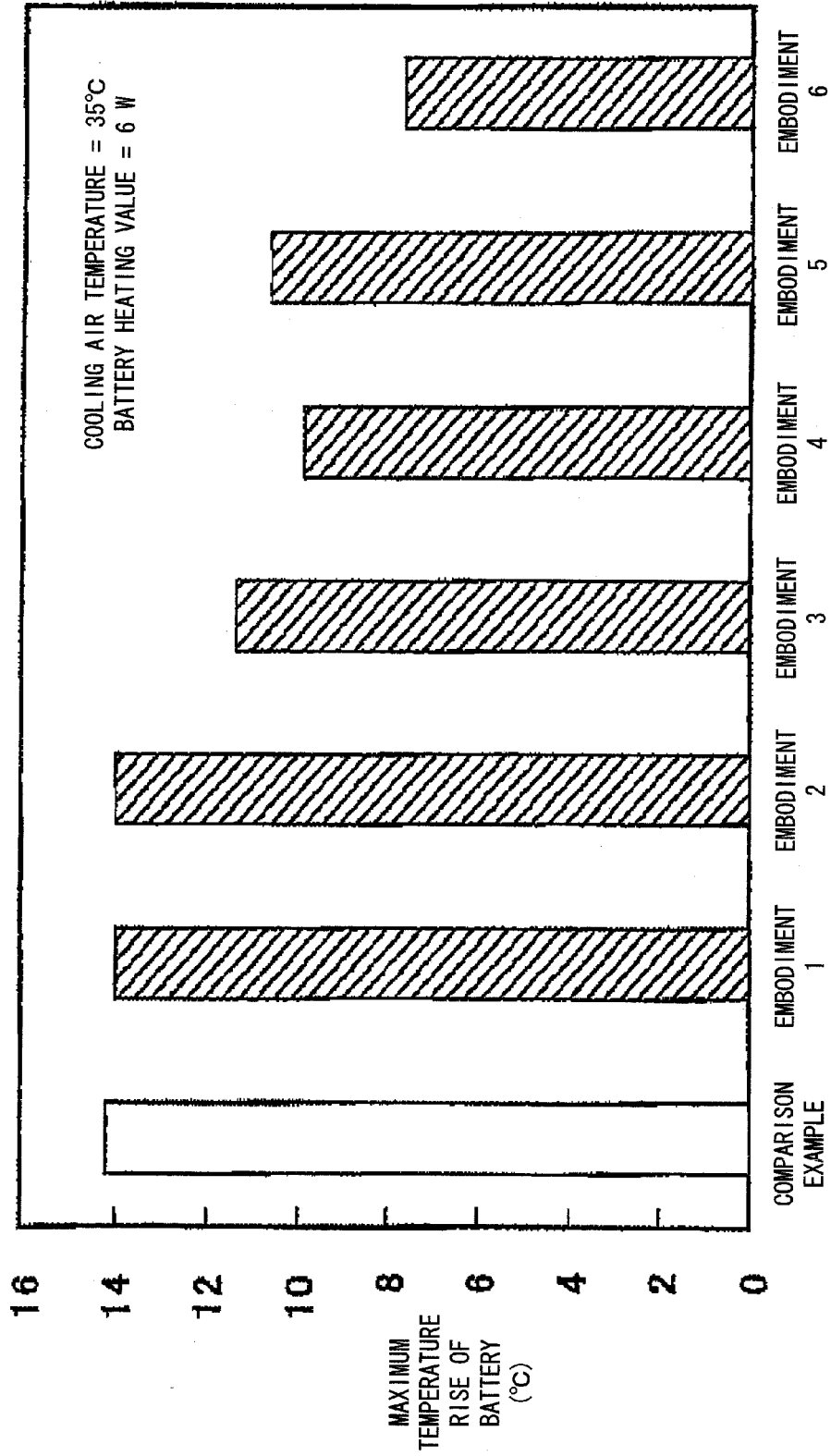
FIG. 14 is a chart showing an analysis result related to the maximum temperature rise in the first to the sixth embodiment and a comparison example.

An example of analysis conducted using universal thermo-fluid analysis software will be explained based upon FIG. 14.

The analysis was conducted on the battery assemblies 10 according to the first to the sixth embodiments and a comparison example in which a battery assembly was configured using a cell holder 2 of the first embodiment from which the baffle plate 5 was removed. FIG. 14 shows the maximum temperature rise (° C.) by heating at one prismatic battery cell of the first to the sixth embodiment and the comparison example.

As main analysis conditions, the cooling air temperature was set to 35° C., the heating value of the prismatic battery cell was set to approximately 6 W, the flow rate of the cooling air was set to 0.03 $m^3$/minute (the surface flow speed of the prismatic battery cell was approximately 1.5 m/second), and the height of the protrusions that forms the cooling channel 9 was se to 2 mm.

As a result of the analysis, on the basis of the temperature 35° C. of the cooling air, while the maximum temperature on the surface of the prismatic battery cell was 49.1° C. in the comparison example, it was 48.9° C. in the first embodiment, 48.9° C. in the second embodiment, 46.3° C. in the third embodiment, 44.8° C. in the fourth embodiment, 45.6° C. in the fifth embodiment, and 42.6° C. in the sixth embodiment.

In each of the embodiments, a temperature reducing effect was achieved compared to the comparison example. Thus, the cooling structure according to the first to the sixth embodiments using the baffle plates 5 and 6, the guide plates 7 and 8, and the like is an effective means for improving cooling performance of a prismatic battery cell and, as well as improving the cooling efficiency of the prismatic battery cell, it can achieve uniformization of temperature distribution at the prismatic battery cell. Among the embodiments, the sixth embodiment has the highest effect and thus it is concluded to be the most effective means for improving cooling performance of a prismatic battery cell.

Seventh Embodiment

Figure 15:
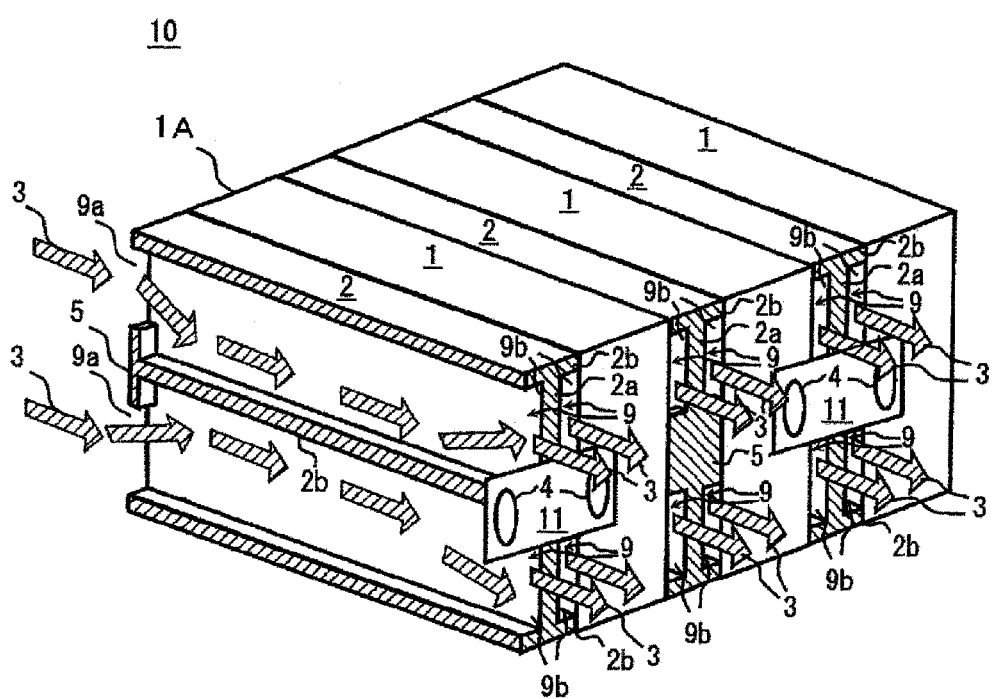
FIG. 15 is a perspective view showing the structure of the prismatic battery assembly according to a seventh embodiment of the present invention, viewed from the outflow side of the cooling medium.
Figure 16:
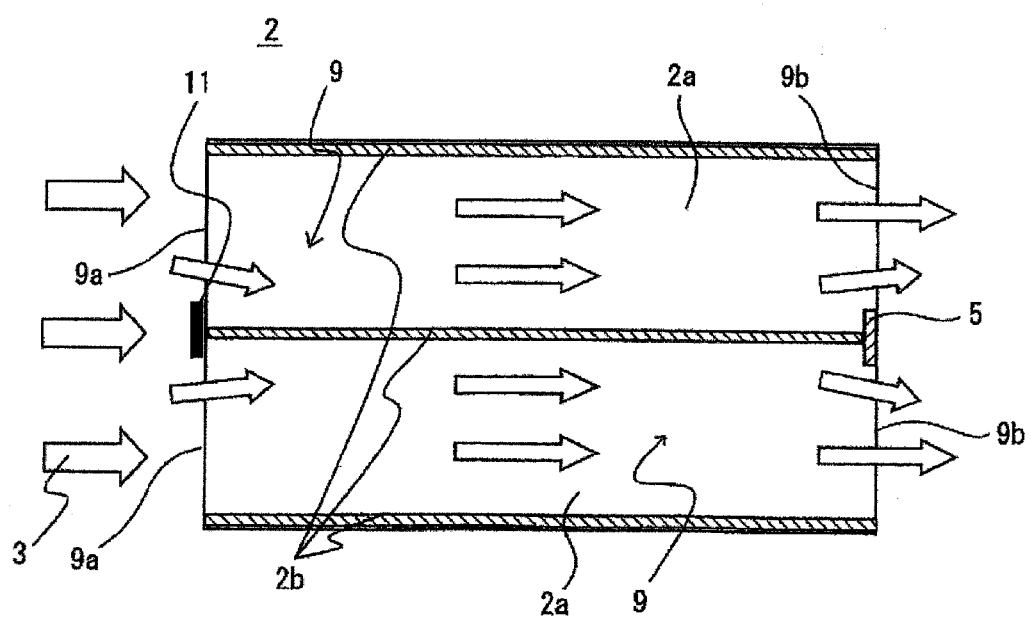
FIG. 16 is a plan view showing the structure of the cell holder and the bus bar of FIG. 15.

The seventh embodiment of the present invention will be explained based upon FIG. 15 and FIG. 16.

The present embodiment, which is an example of achievement of the structure of the second embodiment by varying the first embodiment, has differences from the first embodiment in the position of the electrode terminals 4 of the prismatic battery cell 1 and the arrangement of the cell holder 2. The other parts of the structure are the same as those of the first embodiment. For this reason, parts that are the same as those of the first embodiment are designated by the same reference numerals of the first embodiment, and their description will be curtailed.

In the present embodiment, one pole of the electrode terminals 4 (for example, the positive electrode terminal 4) is provided in the longitudinal center portion of the side surface of one longitudinal end portion of the prismatic battery cell 1 and the other pole of the electrode terminal 4 (for instance, the electrode terminal 4 of negative electrode) is provided in the longitudinal center portion of the side surface of the other longitudinal end portion of the prismatic battery cell 1. There is a difference in polarity between the electrode terminals 4 on the one longitudinal end side of the two prismatic battery cells 1 that are adjacent through the cell holder 2 and between the electrode terminals 4 on the other longitudinal end side. For this reason, the polarity of the electrode terminal 4 on one longitudinal end side of the prismatic battery cell 1 and the polarity of the electrode terminal 4 on the other end side in the array of the plurality of prismatic battery cells 1 (the prismatic battery assembly 10) are alternated in accordance with the array order of the prismatic battery cells 1.

In the two prismatic battery cells 1 that are adjacent through the cell holder 2, the electrode terminals 4 are electrically connected via a bus bar 11 in the longitudinal center portion of either the side surface on one longitudinal end side or the side surface on the other end side. In addition, the electrode terminals 4 on the other side of either the side surface on the one longitudinal end side or the side surface on the other end side of the two prismatic battery cells 1 that are adjacent through the cell holder 2 are each electrically connected via the bus bar 11 with the electrode terminal 4 of opposite polarity of the prismatic battery cell 1 that is adjacent on the other side. Due to this, in the array of the plurality of prismatic battery cells 1 (the prismatic battery assembly 10), a connection section of the electrode terminals 4 on one longitudinal end side of the two adjacent prismatic battery cells 1 and a connection section of the electrode terminals 4 on the other end side thereof are alternated in accordance with the array order of the prismatic battery cells 1. In other words, in the array of the plurality of prismatic battery cells 1 (the prismatic battery assembly 10), the connection section of the electrode terminals 4 on one longitudinal end side of the two adjacent prismatic battery cells 1 and the connection section of the electrode terminals 4 on the other end side thereof are alternately provided in a staggering manner in accordance with the array order of the prismatic battery cells 1.

The bus bar 11 is a strip-like, copper or aluminium conductive member that, in the transverse center portion of the prismatic battery cell 1, spans over and covers the cooling medium inlet opening 9a or the cooling medium outlet opening 9b of the cooling channel 9 across the adjacent prismatic battery cells 1. In addition, the dimension of the bus bar 11 in the transverse direction of the prismatic battery cell 1 is substantially the same as that of the baffle plate 5. Due to this, the bus bar 11 can serve similarly to the baffle plate 5 of the cell holder 2 and the bus bar 11 can be cooled by the cooling medium 3. The bus bar 11 and the electrode terminal 4 may be connected by welding or by fixing with a screw member.

Then, in the present embodiment, the baffle plate 5 of the cell holder 2 is arranged between the adjacent prismatic battery cells 1 so as to be arranged on the opposite side of the side on which the bus bar 11 is arranged. More specifically, between the adjacent prismatic battery cells 1 on the near side shown in FIG. 15 (the prismatic battery cell 1 on the nearest side is not shown in the figure), the center portion of the cooling medium inlet opening 9a of the cooling channel 9 is covered by the baffle plate 5 and the center portion of the cooling medium outlet opening 9b of the cooling channel 9 is covered by the bus bar 11. Between the next adjacent prismatic battery cells 1, the center portion of the cooling medium inlet opening 9a of the cooling channel 9 is covered by the bus bar 11 (not shown in the figure) and the center portion of the cooling medium outlet opening 9b of the cooling channel 9 is covered by the baffle plate 5. Between the further next adjacent prismatic battery cells 1, the center portion of the cooling medium inlet opening 9a of the cooling channel 9 is covered by the baffle plate 5 (not shown in the figure) and the center portion of the cooling medium outlet opening 9b of the cooling channel 9 is covered by the bus bar 11. In this manner, as a means for covering the center portion of the cooling medium inlet opening 9a and the cooling medium outlet opening 9b of the cooling channel 9, the baffle plate 5 of the cell holder 2 and the bus bar 11 are used alternately in accordance with the array order of the prismatic battery cells 1.

In the present embodiment, a connection member that electrically connects the electrode terminals 4 between the adjacent prismatic battery cells 1, i.e., the bus bar (conductive member) 11 functions also as a member that covers a part of the cooling channel 9 provided on an upstream side, preferable the most upstream, of the cooling channel 9. Thus, in the present embodiment, since the same structure as that of the second embodiment can be achieved by varying the first embodiment, the same operations and advantageous effects as those of the second embodiment can be achieved. In addition, in the present embodiment, since the bus bar 11 can be cooled by the cooling medium 3, heat at the prismatic battery cell 1 can be released from the electrode terminal 4 through the bus bar 11 and thus cooling performance of the prismatic battery cell 1 can be further improved.

Eighth Embodiment

The eighth embodiment of the present invention will be explained based upon FIG. 17.

The present embodiment is an improvement example of the seventh embodiment and an example in which the cell holder 2 of the second embodiment in which the baffle plates 5 and 6 are formed is applied to the cell holder 2 of the prismatic battery assembly 10 of the seventh embodiment. The other parts of the structure are the same as those of the seventh embodiment. For this reason, parts that are the same as those of the seventh embodiment are designated by the same reference numerals of the seventh embodiment, and their description will be curtailed.

Figure 17:
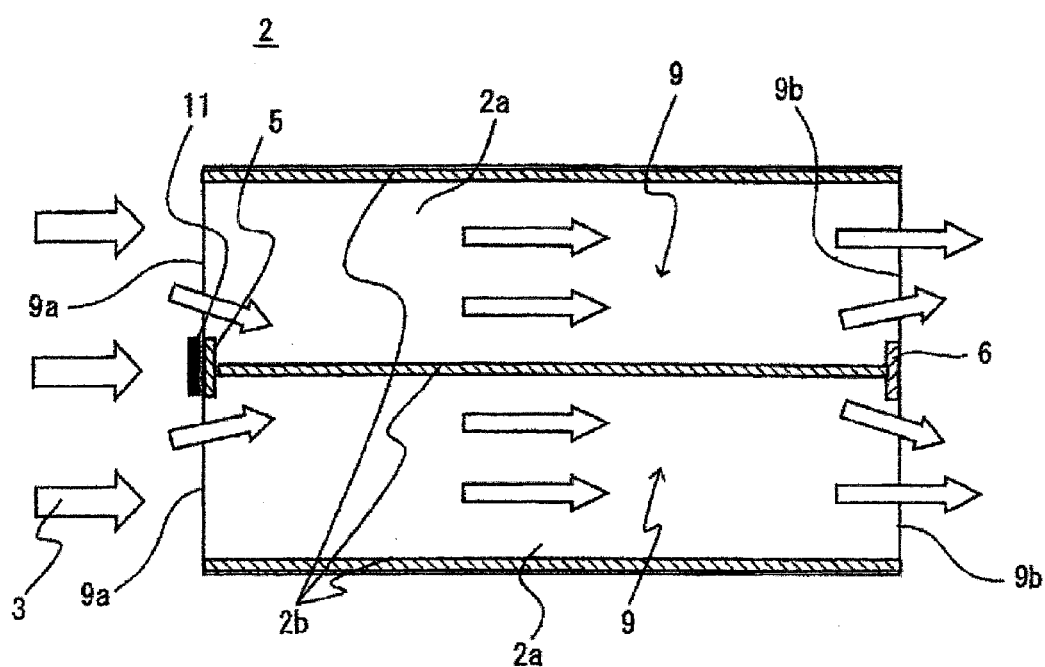
FIG. 17 is a plan view showing the structure of the cell holder and the bus bar that are used in the prismatic battery assembly according to an eighth embodiment of the present invention.

As shown in FIG. 17, the bus bar 11 is provided so as to cover a part of the cooling medium inlet opening 9a or the cooling medium outlet opening 9b of the cell holder 2 in which the baffle plates 5 and 6 are formed. Due to this, in the present embodiment, the same operations and advantageous effects as those of the seventh embodiment can be achieved and the bus bars 11 can be supported by the baffle plates 5 and 6, and thus the supporting strength of the bus bar 11 can be improved.

Ninth Embodiment

Figure 18:
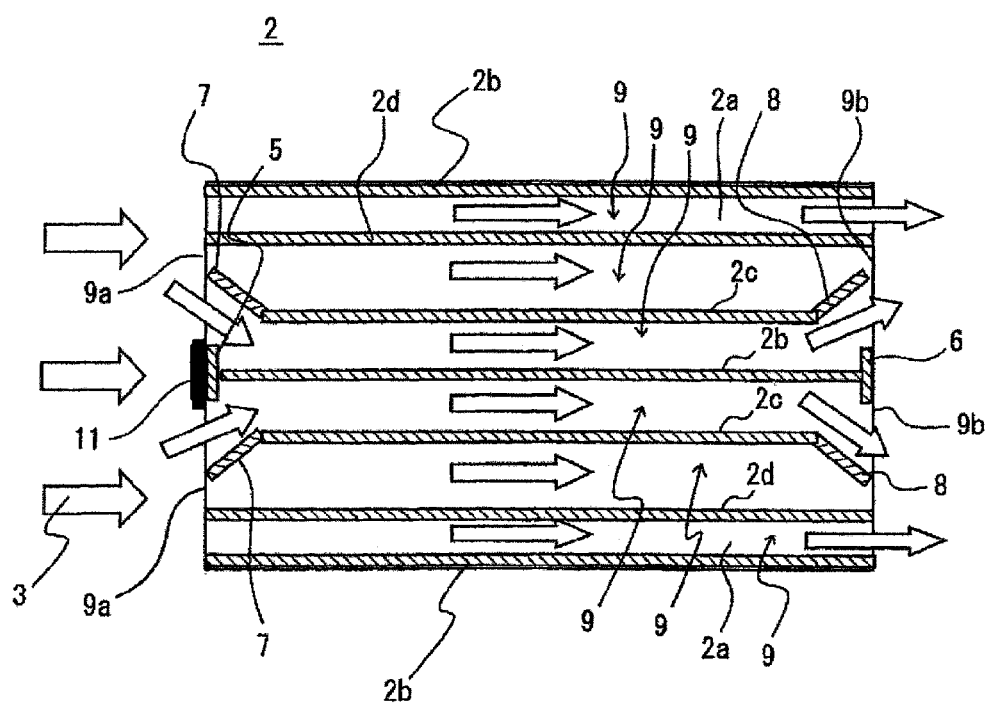
FIG. 18 is a plan view showing the structure of the cell holder and the bus bar that are used in the prismatic battery assembly according to a ninth embodiment of the present invention.

The ninth embodiment of the present invention will be explained based upon FIG. 18.

The present embodiment is an improvement example of the seventh embodiment and an example in which the cell holder 2 of the sixth embodiment is applied to the cell holder 2 of the prismatic battery assembly 10 of the seventh embodiment. The other parts of the structure are the same as those of the seventh embodiment. For this reason, parts that are the same as those of the seventh embodiment are designated by the same reference numerals of the seventh embodiment, and their description will be curtailed.

In addition, in the present embodiment, the size of the baffle plates 5 and 6 formed in the cell holder 2 is less than the size of the bus bar 11. More specifically, the area of the baffle plates 5 and 6 in the flow direction of the cooling medium 3, i.e., the area of the baffle plates 5 and 6 along the transverse direction of the cell holder 2, is less than the area of the bus bar 11. Such structure allows a part of the bus bar 11 arranged on the cooling medium outlet opening 9b side of the cooling channel 9 to be partially cooled from the flow direction side of the cooling medium 3, i.e., the upstream side of the bus bar 11.

In the present embodiment, the same operations and advantageous effects as those of the seventh embodiment can be achieved and a part of the bus bar 11 arranged on the cooling medium outlet opening 9b side of the cooling channel 9 can be partially cooled from the flow direction side of the cooling medium 3. Due to this, the problem in the eighth embodiment of difficulty in cooling the bus bar 11 arranged on the cooling medium outlet opening 9b side of the cooling channel 9 can be solved in the present embodiment.

Tenth Embodiment

The tenth embodiment of the present invention will be explained based upon FIG. 19.

In the present embodiment, an example in which a prismatic battery module 100 is configured using the prismatic battery assembly 10 of any of the first to the ninth embodiments is shown.

Figure 19:
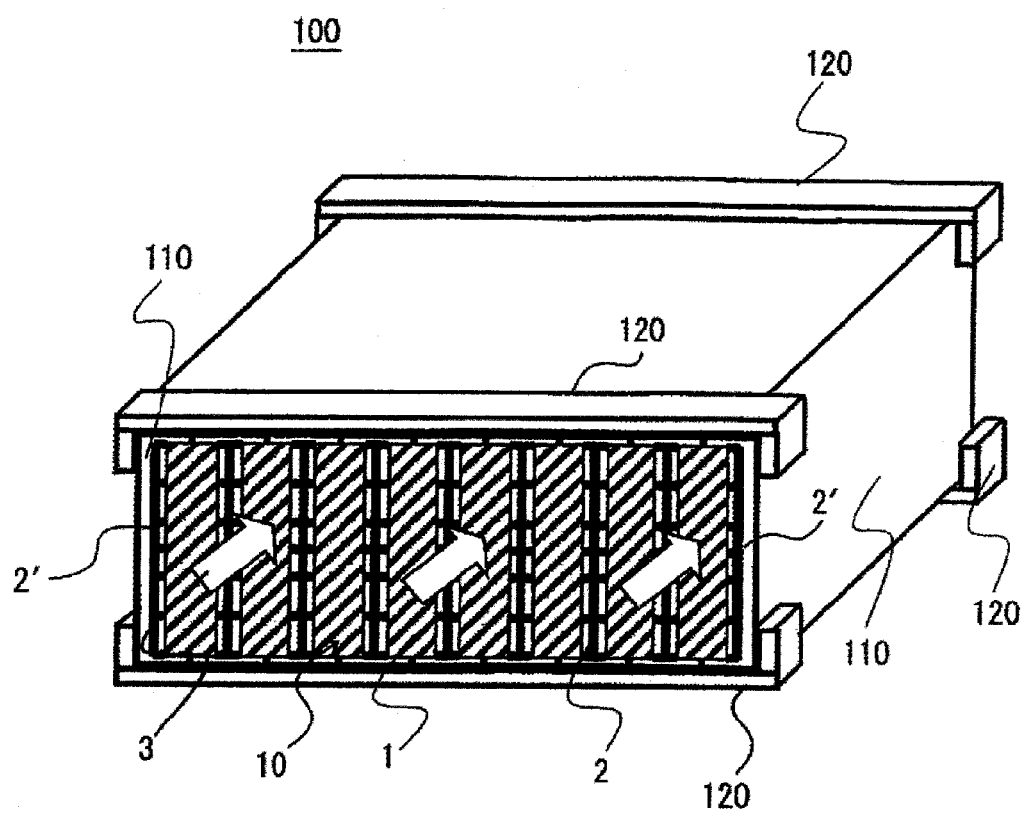
FIG. 19 is a perspective view showing the structure of the prismatic battery module according to a tenth embodiment of the present invention.

It is to be noted that FIG. 19 illustrates the prismatic battery assembly 10 of the sixth embodiment as a representative example. In addition, in FIG. 19, an illustration of the electrode terminals 4 of the prismatic battery cell 1 is curtailed.

The prismatic battery assembly 10 of the present embodiment is configured by vertically placing the eight prismatic battery cells 1, alternately arranging the prismatic battery cells 1 and the cell holders 2 in a row, and electrically connecting the eight prismatic battery cells 1 in series. A cell holder 2' is arranged at the both end portions of the prismatic battery assembly 10 in the array direction of the prismatic battery cells 1. An end surface plate 110 is arranged further outward of the cell holder 2'. The arrangement that is constituted with the prismatic battery assembly 10, the cell holders 2', and the end surface plates 110 is held and fixed by four connection plates 120.

The cell holder 2' is a member with irregularity on one side that electrically insulates between the prismatic battery cell 1 arranged at the both end portions of the prismatic battery assembly 10 and the end surface plate 110 and transmits pressure (constraint force or holding force) that has been transmitted from the end surface plate 110 to the prismatic battery cell 1 arranged at the both end portions of the prismatic battery assembly 10 so as to hold the prismatic battery cell 1. The cell holder 2' is, similarly to the cell holder 2, a plastic molding formed from an electric insulating member. More specifically, the cell holder 2' is a molding with the same size as the size of the planar portion 2a of the cell holder 2 and an irregularity member in which, similarly to the cell holder 2, the protrusions 2b, 2c, and 2d, the baffle plates 5 and 6, and the guide plates 7 and 8 are formed on the prismatic battery cell 1 side and the end surface plate 110 side is configured to be a plane.

When the irregularity side of the cell holder 2' is arranged on the opposite side of the prismatic battery cells 1 arranged at the both end portions of the prismatic battery assembly 10, with the opposite side being opposite to a side arranged next to another rectangular battery cell 1, the cooling channel 9 that is the same as the cooling channel 9 formed between the adjacent prismatic battery cells 1 is formed on the opposite side of the side next to another prismatic battery cell 1 of the prismatic battery cells 1 arranged at the both end portions of the prismatic battery assembly 10.

The end surface plate 110 is a metal member that uniformly applies tightening force of the connection plate 120 to the arrangement that is constituted with the prismatic battery assembly 10 and the cell holder 2' from both sides of the array direction thereof. The end surface plate 110 has a plane with the same size as the size of the top and bottom surfaces of the prismatic battery cell 1 and the plane of the cell holder 2'.

The connection plate 120, which is a metal member that extends in the array direction of the arrangement that is constituted with the prismatic battery assembly 10, the cell holders 2', and the end surface plates 110 and spans across the two end surface plates 110, is an elongated, crown-shaped plate member whose both end portions are bent at a right angle in the same direction. The four connection plates 120 are provided at the both end portions (four corners) of the arrangement in the flow direction of the cooling medium 3 so as to hold the arrangement from the direction perpendicular to the array direction of the arrangement that is constituted with the prismatic battery assembly 10, the cell holders 2', and the end surface plates 110 and the flow direction of the cooling medium 3 (the vertical direction of FIG. 19), and the array direction of the arrangement (the horizontal direction of FIG. 19). That is, the four connection plates 120 press the arrangement from the both sides of the array direction of the arrangement at the four corners on the opposite side of the cell holder 2' side of the end surface plate 110, and press the arrangement from the direction perpendicular to the array direction of the arrangement and the flow direction of the cooling medium 3. Pressure applied from the connection plates 120 to the end surface plates 110 are uniformly dispersed by the end surface plates 110 and transmitted to the arrangement that is constituted with the prismatic battery assembly 10 and the cell holders 2'. This allows the eight prismatic battery cells 1 to be firmly held.

In the present embodiment, since the prismatic battery assembly 10 of any of the first to the ninth embodiments, which can improve cooling performance of the prismatic battery cell 1, is mounted, the same operations and advantageous effects as those of the first to the ninth embodiments can be achieved, and downsizing of the prismatic battery module 100 and reliability improvement of the prismatic battery module 100 can be achieved.

Eleventh Embodiment

Figure 20:
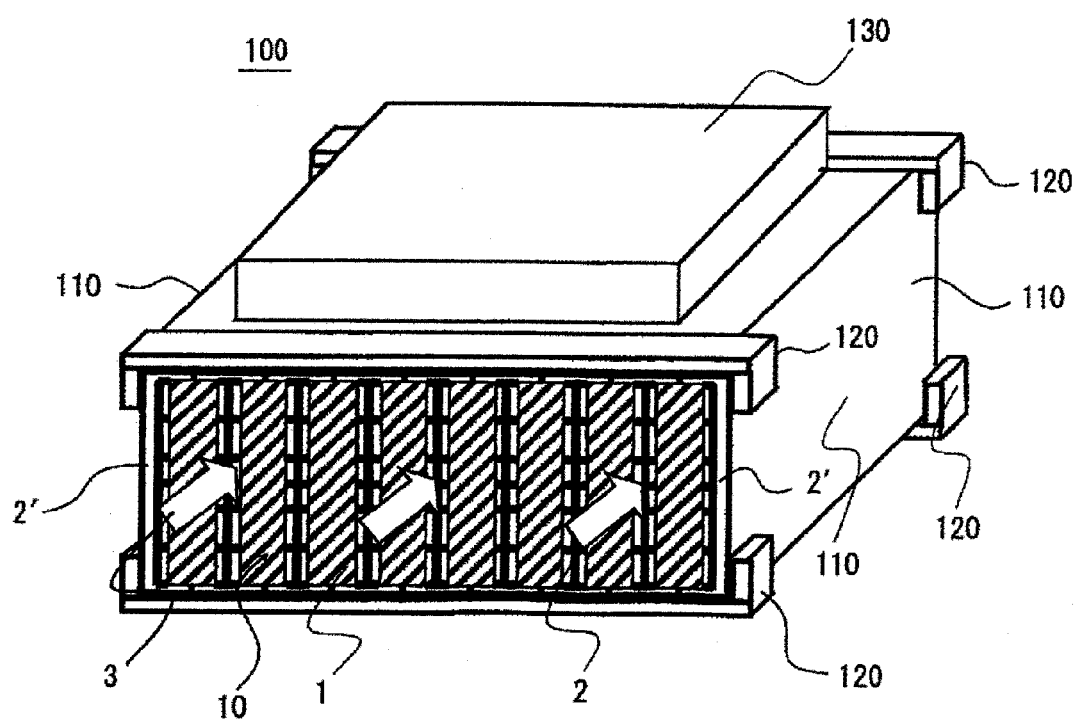
FIG. 20 is a perspective view showing the structure of the prismatic battery module according to an eleventh embodiment of the present invention.

The eleventh embodiment of the present invention will be explained based upon FIG. 20.

The present embodiment is an improvement example of the tenth embodiment and differs from the tenth embodiment in the structure in which a control device 130, which manages and controls a state of the electricity storage module 100, is integrated with the electricity storage module 100. The other parts of the structure are the same as those of the tenth embodiment. For this reason, parts that are the same as those of the tenth embodiment are designated by the same reference numerals of the tenth embodiment, and their description will be curtailed.

The control device 130 includes a cell control device that performs voltage detection, adjustment of the state of charge, overcharge/discharge detection, and the like of each of the eight prismatic battery cells 1 and a battery control device that detects charge/discharge voltage, current, and temperature at the prismatic battery assembly 10, calculates the state of charge and the state of health of the prismatic battery assembly 10 and allowable charge/discharge electric power or current for controlling charge/discharge of the prismatic battery assembly 10, and outputs this calculation information to another control device. A plurality of electronic components that constitute the cell control device and the battery control device, for instance, an integrated circuit, a microcomputer, a resistor, a semiconductor switch, a photocoupler, and the like are mounted on a wiring board and housed inside a metal case.

The metal case is mounted and fixed on an upper portion of the electricity storage module 100 (one side of the prismatic battery module 100 in the direction perpendicular to the array direction of the arrangement that is constituted with the prismatic battery assembly 10, the cell holders 2', and the end surface plates 110 and the flow direction of the cooling medium 3).

In the present embodiment, the same operations and advantageous effects as those of the tenth embodiment can be achieved.

Twelfth Embodiment

Figure 21:
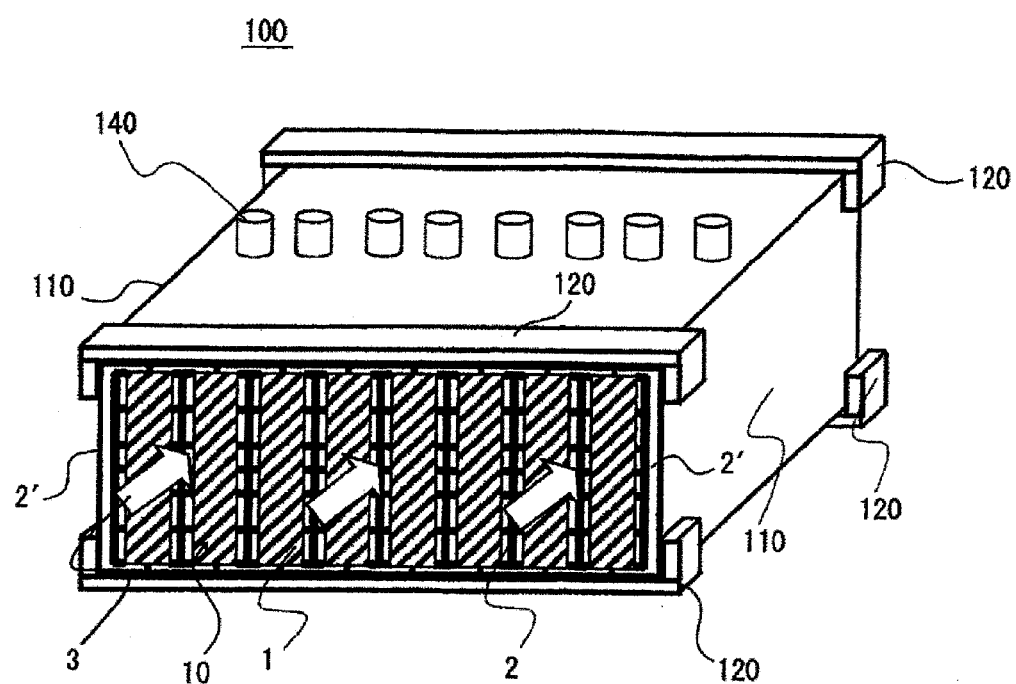
FIG. 21 is a perspective view showing the structure of the prismatic battery module according to a twelfth embodiment of the present invention.

The twelfth embodiment of the present invention will be explained based upon FIG. 21.

The present embodiment is an improvement example of the tenth embodiment and differs from the tenth embodiment in a structure of a gas release mechanism of the prismatic battery cell 1. The other parts of the structure are the same as those of the tenth embodiment. For this reason, parts that are the same as those of the tenth embodiment are designated by the same reference numerals of the tenth embodiment, and their description will be curtailed.

The prismatic battery cell 1 is provided with a gas release valve. The gas release valve is a safety valve that, when any abnormality occurs in the prismatic battery cell 1 so that electrolyte solution is evaporated and internal pressure rises, is actuated at a predetermined internal pressure and emits misty gas to the outside of the cell can 1A, thereby protecting the cell can 1A. The misty gas is released from the prismatic battery module 100 together with the cooling medium 3 but, depending upon the mounting position of the battery device, the misty gas may be released separately from the cooling medium 3. In such case, the gas release valve of the prismatic battery cell 1 is connected with a gas release pipe 140 and, if the gas release valve is actuated, gas that has been released from the prismatic battery cell 1 is released to the outside though the gas release pipe 140. In the present embodiment, the gas release pipe 140 protrudes on an upper portion of the electricity storage module 100 (one side of the prismatic battery module 100 in the direction perpendicular to the array direction of the arrangement that is constituted with the prismatic battery assembly 10, the cell holders 2', and the end surface plates 110, and the flow direction of the cooling medium 3). The gas release pipes 140 are arranged in a row in the array direction of the prismatic battery cells 1 corresponding to the array of the prismatic battery cells 1.

In the present embodiment, the same operations and advantageous effects as those of the tenth embodiment can be achieved.

Thirteenth Embodiment

Figure 22:
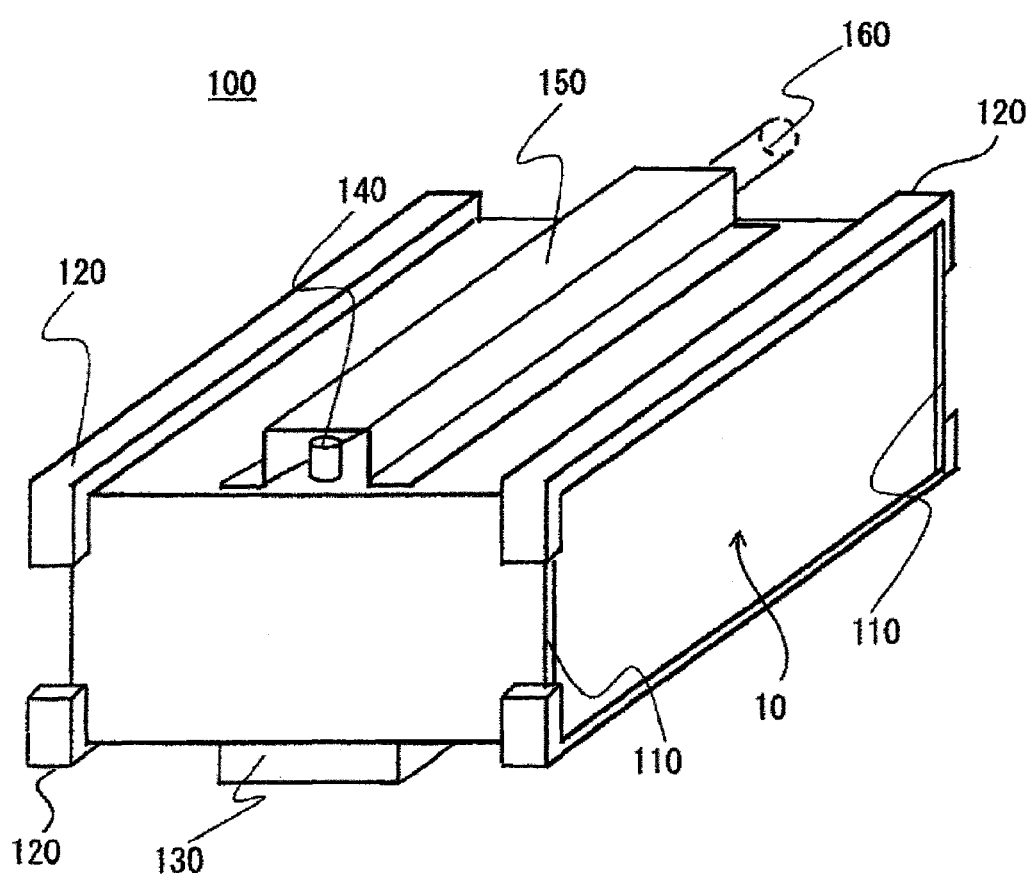
FIG. 22 is a perspective view showing the structure of the prismatic battery module according to a thirteenth embodiment of the present invention.

The thirteenth embodiment of the present invention will be explained based upon FIG. 22.

The present embodiment is an improvement example of the tenth embodiment and an example in which the eleventh embodiment and the twelfth embodiment are combined. The other parts of the structure are the same as those of the tenth embodiment. For this reason, parts that are the same as those of the tenth embodiment are designated by the same reference numerals of the tenth embodiment, and their description will be curtailed.

In the present embodiment, the gas release pipes 140 shown in the twelfth embodiment are arranged on an upper portion of the prismatic battery module 100 (one side of the prismatic battery module 100 in the direction perpendicular to the array direction of the arrangement that is constituted with the prismatic battery assembly 10, the cell holders 2', and the end surface plates 110, and the flow direction of the cooling medium 3) and the control device 130 shown in the eleventh embodiment is arranged on a lower portion of the prismatic battery module 100 (the other side of the prismatic battery module 100 in the direction perpendicular to the array direction of the arrangement that is constituted with the prismatic battery assembly 10, the cell holders 2', and the end surface plates 110, and the flow direction of the cooling medium 3).

The gas release pipes 140 are covered by a gas release duct 150 that extends in the array direction of the arrangement that is constituted with the prismatic battery assembly 10, the cell holders 2', and the end surface plates 110 (for ease of comprehension, a gas release pipe 140 is illustrated as viewable from the gas release duct 150 but in practice, the end surface of the gas release duct 150 is covered by a wall). A gas outlet pipe 160 is provided at the end of one side of the gas release duct 150. Gas released from the gas release pipes 140 to the gas release duct 150 is guided and released to the outside of the vehicle through the gas outlet pipe 160.

In the present embodiment, the same operations and advantageous effects as those of the tenth embodiment can be achieved.

Although the variety of embodiments and examples of variations are described above, the present invention is not to be limited only to those contents. The scope of the present invention includes other possible embodiments invented within the scope of the technical idea of the present invention.

The disclosure of the following priority application is herein incorporated by reference:
Japanese Patent Application No. 2009-225949 (filed Sep. 30, 2009)

The invention claimed is:

1. An electricity storage module, comprising:
   an electric storage unit block that is constituted by arraying a plurality of prismatic electric storage units through a holding member; and
   a cooling channel that is formed between the electric storage unit and the holding member, through which a cooling medium for cooling the electric storage unit flows, wherein:
   a central part of a cooling medium inlet opening of the cooling channel is covered so that a flow speed of a cooling medium after flowing into the cooling channel is higher than a flow speed of a cooling medium before flowing into the cooling channel, and
   a pair of guiding members that deflects a flow of the cooling medium to a direction to a center of the electric storage unit is provided on a most upstream side of the cooling channel, the pair of guiding members being configured to slope toward a center of the cooling channel and to concentrate the flow of the cooling medium to the center of the cooling channel.

2. An electricity storage module according to claim 1, wherein:
   a covering member is provided centrally in the cooling medium inlet opening of the cooling channel so as to cover the part of the cooling medium inlet opening.

3. An electricity storage module according to claim 1, wherein:
   a pair of guiding members that deflects a flow of the cooling medium to a direction outwards from the center of the electric storage unit is provided on a most downstream side of the cooling channel.

4. An electricity storage module according to claim 3, wherein:
   the cooling channel is divided by connecting the guiding member that is provided on the most upstream side of the cooling channel with the guiding member that is provided on the most downstream side of the cooling channel.

5. An electricity storage module according to claim 1, wherein:
   a conductive member for electrically connecting the electric storage units is provided in the cooling medium inlet opening of the cooling channel so as to cover the part of the cooling medium inlet opening.

6. An electricity storage module according to claim 5, wherein:
   a baffle plate is provided on a most upstream side or a most downstream side of the cooling channel.

7. An electricity storage module according to claim 5, wherein:
   a baffle plate is provided on a most upstream side and a most downstream side of the cooling channel.

8. An electricity storage module according to claim 5, wherein:
   a guiding member that deflects a flow of the cooling medium to a direction to a center of the electric storage unit is provided on a most upstream side of the cooling channel; and
   a guiding member that deflects a flow of the cooling medium to a direction outwards from the center of the electric storage unit is provided on a most downstream side of the cooling channel.

9. An electricity storage module according to claim 6, wherein:
   a guiding member that deflects a flow of the cooling medium to a direction to a center of the electric storage unit is provided on a most upstream side of the cooling channel; and
   a guiding member that deflects a flow of the cooling medium to a direction outwards from the center of the electric storage unit is provided on a most downstream side of the cooling channel.

10. An electricity storage module according to claim 7, wherein:
    a guiding member that deflects a flow of the cooling medium to a direction to a center of the electric storage unit is provided on a most upstream side of the cooling channel; and
    a guiding member that deflects a flow of the cooling medium to a direction outwards from the center of the electric storage unit is provided on a most downstream side of the cooling channel.

11. An electricity storage module, comprising:
    an electric storage unit block that is constituted by arraying a plurality of prismatic electric storage units through a holding member; and
    a cooling channel that is formed between the electric storage unit and the holding member, through which a cooling medium for cooling the electric storage unit flows, wherein:
    a part of a cooling medium inlet opening of the cooling channel is covered so that a flow speed of a cooling medium after flowing into the cooling channel is higher than a flow speed of a cooling medium before flowing into the cooling channel, and
    a pair of guiding members provided on a most upstream side of the cooling channel, that deflects a concentrated flow of the cooling medium to a center of the electric storage unit, in comparison to less-concentrated flows of the cooling medium directed to non-center portions of the electric storage unit, the pair of guiding members being configured to slope toward a center of the cooling channel and to concentrate the flow of the cooling medium to the center of the cooling channel.

* * * * *